United States Patent
Komada et al.

(10) Patent No.: US 11,241,951 B2
(45) Date of Patent: Feb. 8, 2022

(54) DRIVE UNIT FOR HYBRID VEHICLES

(71) Applicant: TOYOTA JIDOSHA KABUSHIKI KAISHA, Toyota (JP)

(72) Inventors: Hideaki Komada, Gotemba (JP); Takahito Endo, Shizuoka-ken (JP); Tatsuya Imamura, Okazaki (JP); Kensei Hata, Shizuoka-ken (JP); Akiko Nishimine, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 15/919,860

(22) Filed: Mar. 13, 2018

(65) Prior Publication Data
US 2018/0264927 A1    Sep. 20, 2018

(30) Foreign Application Priority Data

Mar. 15, 2017    (JP) .............................. JP2017-050281

(51) Int. Cl.
| | |
|---|---|
| *B60K 6/445* | (2007.10) |
| *B60K 6/365* | (2007.10) |
| *B60K 6/547* | (2007.10) |
| *F16H 3/72* | (2006.01) |
| *B60K 6/387* | (2007.10) |
| *B60K 6/38* | (2007.10) |

(52) U.S. Cl.
CPC .............. *B60K 6/445* (2013.01); *B60K 6/365* (2013.01); *B60K 6/387* (2013.01); *B60K 6/547* (2013.01); *F16H 3/728* (2013.01); *B60K 2006/381* (2013.01); *B60Y 2200/92* (2013.01); *F16H 2200/0034* (2013.01); *F16H 2200/2007* (2013.01); *F16H 2200/2038* (2013.01); *Y02T 10/62* (2013.01); *Y02T 10/72* (2013.01); *Y10S 903/911* (2013.01); *Y10S 903/919* (2013.01)

(58) Field of Classification Search
CPC ............. F16H 3/728; F16H 2200/2007; F16H 2200/2038; B60K 6/445; B60K 6/365; B60K 6/547
See application file for complete search history.

(56) References Cited

U.S. PATENT DOCUMENTS 7,393,297 B2 *   7/2008   Raghavan ................ B60K 6/40
                                                             475/5

FOREIGN PATENT DOCUMENTS

JP            2005-155891 A         6/2005

* cited by examiner

*Primary Examiner* — Erin D Bishop
(74) *Attorney, Agent, or Firm* — Hunton Andrews Kurth LLP

(57) ABSTRACT

A drive unit is provided for hybrid vehicles capable of reducing electric power consumption during propulsion in an EV mode. The drive unit includes a first planetary gear unit to which an engine is connected, and a second planetary gear unit connected to a third rotary element of the first planetary gear unit. The drive unit includes a first engagement device that connects a first rotary element of the first planetary gear unit and a sixth rotary element of the second planetary gear unit, and a second engagement device that connects a fourth rotary element and the sixth rotary element of the second planetary gear unit.

11 Claims, 23 Drawing Sheets

|  |  | CL1 | CL2 | BK | No. |
|---|---|---|---|---|---|
| EV | Lo | ○ | × | ○ | 1 |
|  | Free | × | × | — | 2 |
|  | Hi | × | ○ | ○ | 3 |
| HV | Lo | ○ | × | × | 4 |
|  | Fix | ○ | ○ | × | 5 |
|  | Hi | × | ○ | × | 6 |

○ : ENGAGEMENT     — : ENGAGEMENT or DISENGAGEMENT
× : DISENGAGEMENT

Fig.16
|    |      | CL1 | CL2 | BK | No. |
|----|------|-----|-----|----|-----|
| EV | Lo   | ×   | ○   | ○  | 1   |
|    | Free | ×   | ×   | —  | 2   |
|    | Hi   | ○   | ×   | ○  | 3   |
| HV | Lo   | ×   | ○   | ×  | 4   |
|    | Fix  | ○   | ○   | ×  | 5   |
|    | Hi   | ○   | ×   | ×  | 6   |
○:ENGAGEMENT  —:ENGAGEMENT or DISENGAGEMENT
×:DISENGAGEMENT
Fig.17
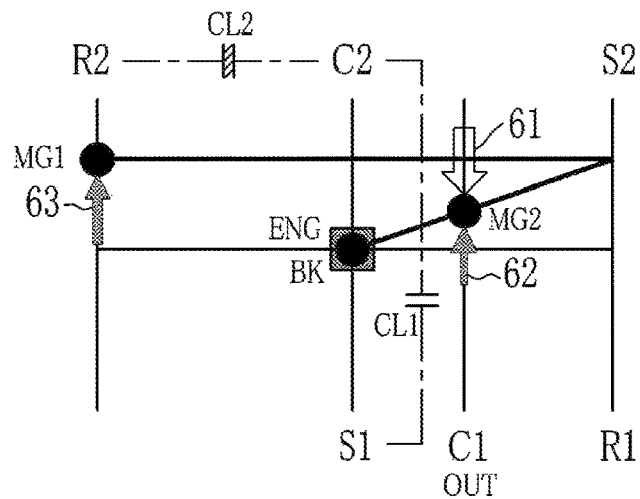
Fig.18
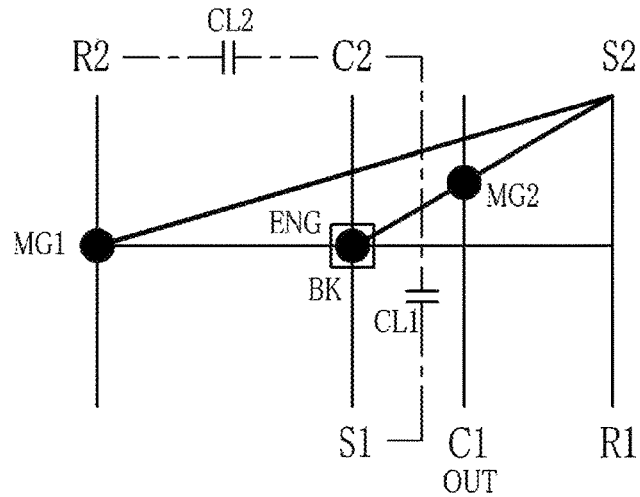

Fig.27
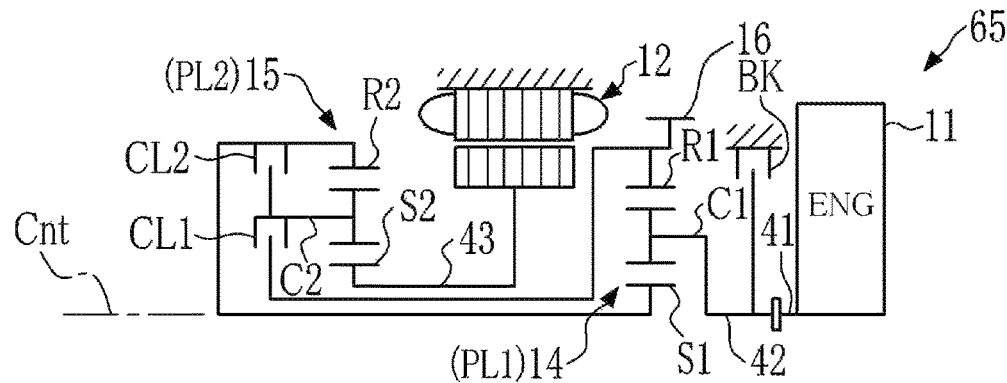
Fig.28
|    |      | CL1 | CL2 | BK | No. |
|----|------|-----|-----|----|-----|
| EV | Lo   | ○   | ×   | ○  | 1   |
|    | Free | ×   | ×   | —  | 2   |
|    | Hi   | ×   | ○   | ○  | 3   |
| HV | Lo   | ○   | ×   | ×  | 4   |
|    | Fix  | ○   | ○   | ×  | 5   |
|    | Hi   | ×   | ○   | ×  | 6   |
○ : ENGAGEMENT — : ENGAGEMENT or DISENGAGEMENT
× : DISENGAGEMENT
Fig.29
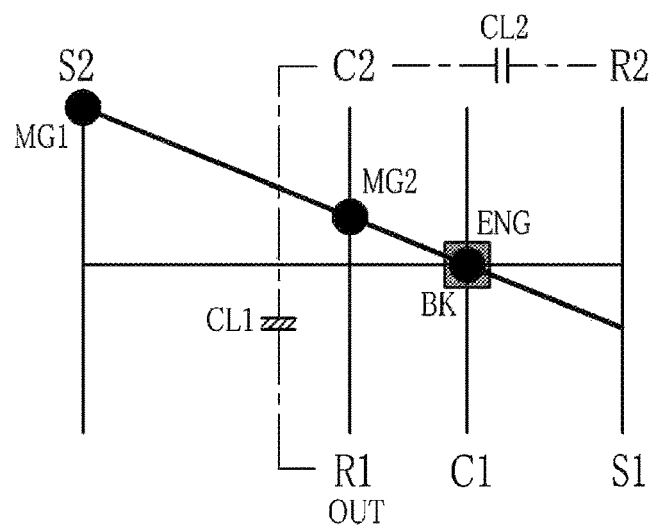

Fig.39
|    |      | CL1 | CL2 | BK | No. |
|----|------|-----|-----|----|-----|
| EV | Lo   | ×   | ○   | ○  | 1   |
|    | Free | ×   | ×   | —  | 2   |
|    | Hi   | ○   | ×   | ○  | 3   |
| HV | Lo   | ×   | ○   | ×  | 4   |
|    | Fix  | ○   | ○   | ×  | 5   |
|    | Hi   | ○   | ×   | ×  | 6   |
○ : ENGAGEMENT  — : ENGAGEMENT or DISENGAGEMENT
× : DISENGAGEMENT
Fig.40
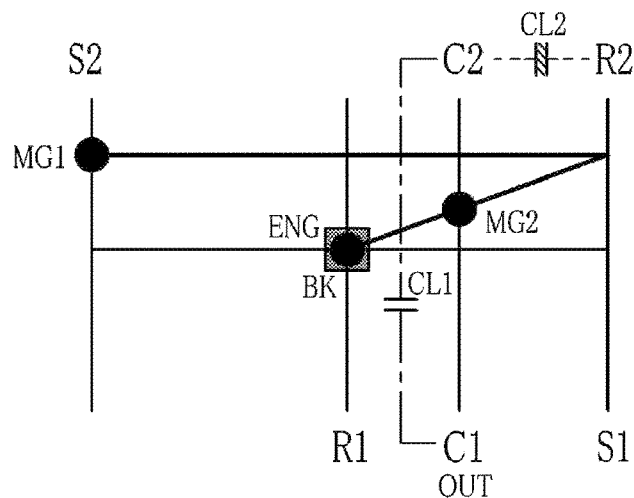
Fig.41
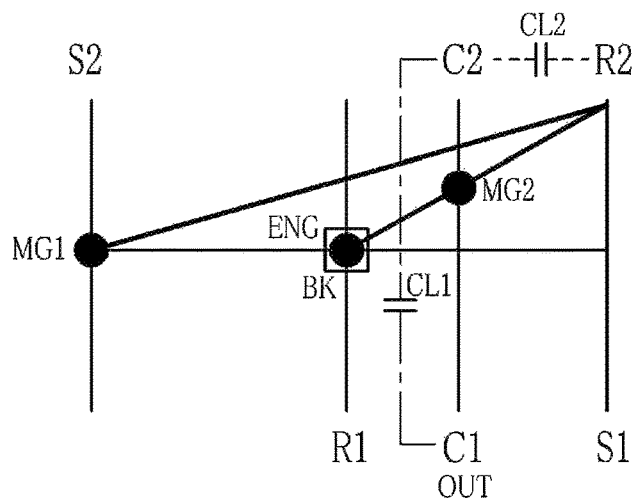

Fig.48
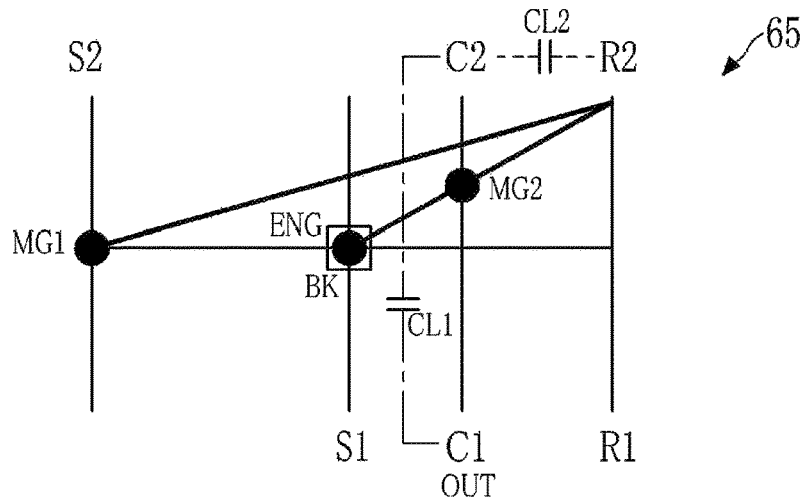
Fig.49
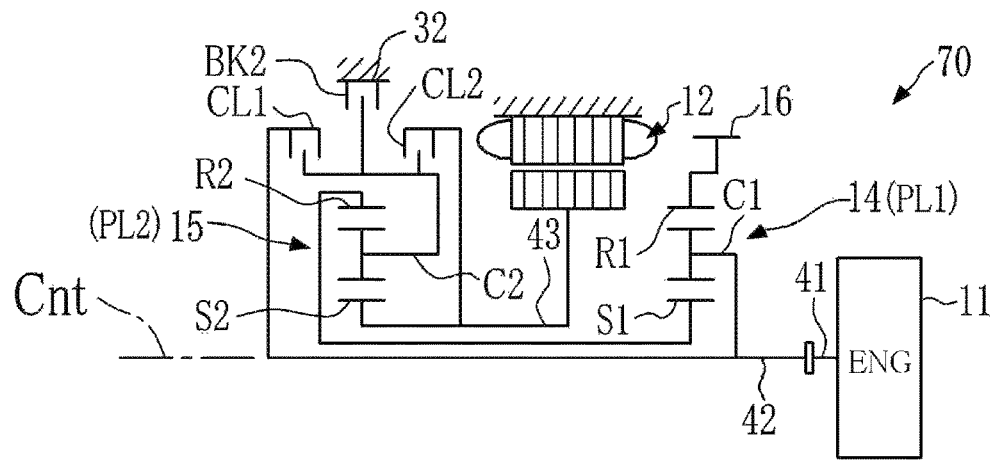
Fig.50
|  |  | CL1 | CL2 | BK2 | No. |
|---|---|---|---|---|---|
| EV | Dual | ○ | × | ○ | 1 |
|  | Free | × | × | − | 2 |
| HV | Fix-Hi | × | ○ | ○ | 3 |
|  | Lo | ○ | × | × | 4 |
|  | Fix-Lo | ○ | ○ | × | 5 |
|  | Hi | × | ○ | × | 6 |
○ : ENGAGEMENT   − : ENGAGEMENT or DISENGAGEMENT
× : DISENGAGEMENT Fig.54
|     |        | CL1 | CL2 | BK2 |
|-----|--------|-----|-----|-----|
| EV  | Dual   | ○   | ×   | ○   |
|     | Free   | ×   | ×   | —   |
| HV  | Fix-Lo | ×   | ○   | ○   |
|     | Hi     | ○   | ×   | ×   |
|     | Fix-Hi | ○   | ○   | ×   |
|     | Lo     | ×   | ○   | ×   |
○:ENGAGEMENT   —:ENGAGEMENT or DISENGAGEMENT
×:DISENGAGEMENT
Fig.55
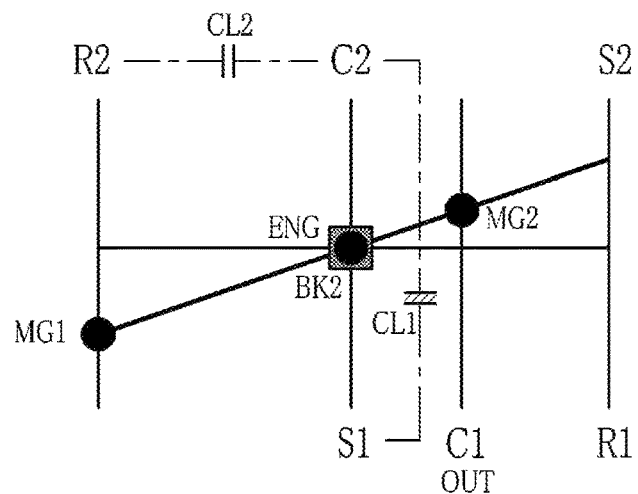
Fig.56
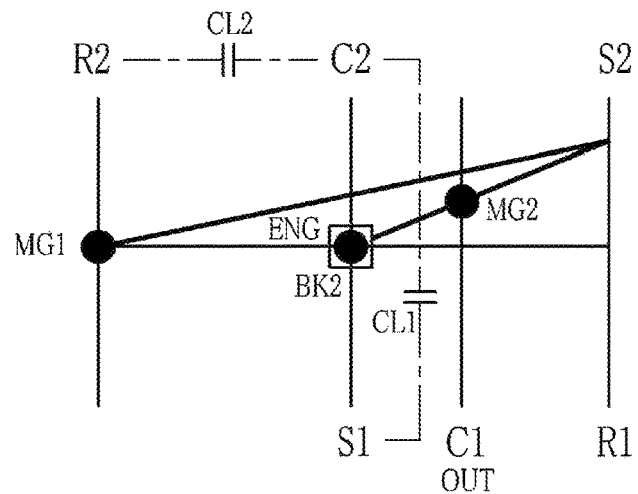

DRIVE UNIT FOR HYBRID VEHICLES

CROSS REFERENCE TO RELATED APPLICATIONS

The present disclosure claims the benefit of Japanese Patent Application No. 2017-050281 filed on Mar. 15, 2017 with the Japanese Patent Office.

BACKGROUND

Field of the Disclosure

Embodiments of the present disclosure relate to the art of a drive unit for a hybrid vehicle in which a prime mover includes an engine and two motors, and in which a drive torque generated by the prime mover is delivered to an output member connected to drive wheels.

Discussion of the Related Art

JP-A-2005-155891 describes a drive unit for hybrid vehicles that includes a Ravigneaux planetary gear unit having a first rotary element to which an engine is connected, a second rotary element to which a first motor/generator is connected, a third rotary element, and a fourth rotary element.

In the drive unit, it is possible to switch between a mode in which the third rotary element and drive wheels are connected to each other and a mode in which the fourth rotary element and the drive wheels are connected to each other by manipulating a clutch, such that an assist torque of a second motor can be synthesized with a drive torque delivered through the third rotary element or the fourth rotary element. In this drive unit, an operating mode can be selected from a hybrid vehicle (HV) mode in which a vehicle is operated by establishing a reaction torque from the first motor/generator to deliver a drive torque of the engine to the third rotary element or the fourth rotary element and an electronic vehicle (EV) mode in which the vehicle is operated by generating a drive torque by a second motor while stopping the engine.

However, in the drive unit taught by the above-mentioned prior art document, the first motor/generator may be rotated passively during propulsion in the EV mode, and there is a risk that power loss will be increased. In order to prevent such passive rotation of the first motor/generator, it is necessary for the first motor/generator to generate a torque counteracting against a torque acting on the first motor/generator by, for example, applying a predetermined current to the first motor/generator. However, this may result in an increase in electric power consumption. In order to avoid such disadvantage, in a conventional drive unit for hybrid vehicles, it is necessary to reduce electric power consumption during the propulsion in the EV mode.

SUMMARY

Aspects of embodiments of the present disclosure have been conceived noting the foregoing technical problems, and it is therefore an object of embodiments of the present disclosure to provide a drive unit for hybrid vehicles that reduces electric power consumption during propulsion in the EV mode.

In order to achieve the above object, the present disclosure provides a drive unit for a hybrid vehicle in which a prime mover includes an engine, a first motor, and a second motor, in which a drive torque generated by the prime mover is delivered to an output member connected to drive wheels, characterized by: a first differential mechanism including a first rotary element to which the engine is connected, a second rotary element to which the second motor and the output member are connected, and a third rotary element; and a second differential mechanism including a fourth rotary element to which the first motor is connected, a fifth rotary element connected to the third rotary element, and a sixth rotary element; a first engagement device adapted to selectively connect the first rotary element or the second rotary element and the sixth rotary element; and a second engagement device adapted to selectively connect any two of the fourth rotary element, the fifth rotary element, and the sixth rotary element.

In a non-limiting embodiment, the first engagement device may be adapted to selectively connect the first rotary element or the second rotary element to the sixth rotary element.

In a non-limiting embodiment, the second engagement device may be adapted to selectively connect two of the fourth to sixth rotary elements, and therefore the second engagement device may connect the fourth rotary element and the fifth rotary element, connect the fourth rotary element and the sixth rotary element, or connect the fifth rotary element and the sixth rotary element.

In a non-limiting embodiment, the first differential mechanism or the second differential mechanism may include a planetary gear unit, and the respective rotary elements may be any one of a sun gear, a ring gear, and a carrier.

According to the embodiment of the present disclosure, the first differential mechanism may be disconnected from the second differential mechanism to interrupt torque transmission therebetween by manipulating the first engagement device and the second engagement device. According to the embodiment of the present disclosure, therefore, the torque will not be applied to the first motor during propulsion in an electric vehicle mode and hence the first motor can be prevented from being rotated in the electric vehicle mode. For this reason, electric power consumption to keep stopping the first motor can be reduced. In addition, it is not necessary to increase an output power of the second motor to compensate a power loss resulting from rotating the first motor passively.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 16 is a diagram for explaining an example of operating modes selectable in the drive unit illustrated in FIG. 15;

FIG. 17 is a nomographic diagram indicating a condition in a first mode shown in FIG. 16;

FIG. 18 is a nomographic diagram indicating a condition in a second mode shown in FIG. 16;

FIG. 27 is a skeleton diagram illustrating a drive unit according to a ninth embodiment;

FIG. 28 is a diagram for explaining an example of operating modes selectable in the drive unit illustrated in FIG. 27;

FIG. 29 is a nomographic diagram indicating a condition in a first mode shown in FIG. 28;

FIG. 39 is a diagram for explaining an example of operating modes selectable in the drive unit illustrated in FIG. 38;

FIG. 40 is a nomographic diagram indicating a condition in a first mode shown in FIG. 39;

FIG. 41 is a nomographic diagram indicating a condition in a second mode shown in FIG. 39;

FIG. 48 is a nomographic diagram indicating a condition in a second mode in a drive unit according to a sixteenth embodiment;

FIG. 49 is a skeleton diagram illustrating a drive unit according to a seventeenth embodiment;

FIG. 50 is a diagram for explaining an example of operating modes selectable in the drive unit illustrated in FIG. 49;

FIG. 54 is a diagram for explaining an example of operating modes selectable in the drive unit illustrated in FIG. 53;

FIG. 55 is a nomographic diagram indicating a condition in a dual mode shown in FIG. 54;

FIG. 56 is a nomographic diagram indicating a condition in a single mode shown in FIG. 54;

DETAILED DESCRIPTION OF THE PREFERRED EMBODIMENT(S)

Figure 1:
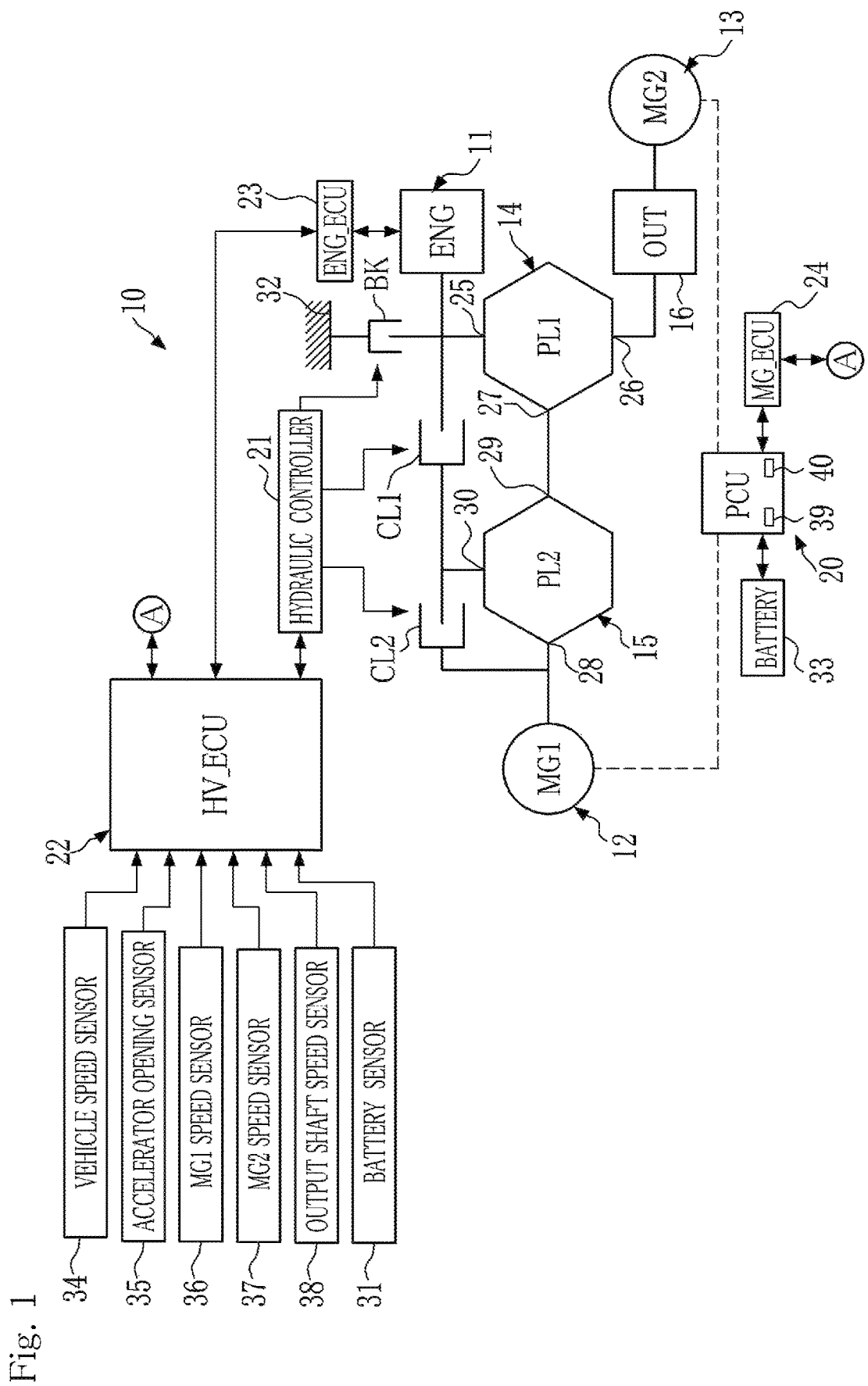
FIG. 1 is a block diagram conceptually illustrating an example of a drive unit for hybrid vehicles according to embodiments of the present disclosure.

FIG. 1 conceptually illustrates an example of a drive unit 10 used for a hybrid vehicle (hereinafter, referred to as "vehicle") according to an embodiment of the present disclosure. As illustrated in FIG. 1, the drive unit 10 includes an engine (referred to as "ENG" in the drawings) 11 as an internal combustion engine, a first motor (referred to as "MG1" in the drawings) 12, a second motor (referred to as "MG2" in the drawings) 13, a first planetary gear unit (referred to as "PL1" in the drawings) 14 as a first differential mechanism, a second planetary gear unit (referred to as "PL2" in the drawings) 15 as a second differential mechanism, an output member (referred to as "OUT" in the drawings) 16, a first clutch CL1, a second clutch CL2, a brake BK, a power control unit (referred to as "PCU" in the drawings) 20, a hydraulic controller 21, a hybrid vehicle electronic control unit (referred to as "HV-ECU" in the drawings) 22 that controls a hybrid vehicle, an engine electronic control unit (referred to as "ENG-ECU" in the drawings) 23 that controls the engine 11, a motor-generator electronic control unit (referred to as "MG-ECU" in the drawings) 24 that controls the motors 12 and 13, and a battery 33. It should be noted that the battery 33 may include power storage devices such as a secondary battery or a capacitor, and the hybrid vehicle may be a plug-in hybrid vehicle that can be charged by an external power supply.

For example, a motor/generator may be used individually as the first motor 12 and the second motor 13. In the drive unit 10, an operating mode in which a vehicle is powered by the second motor 13 may be established by operating the second motor 13 as a motor by electric power generated by the first motor 12.

The first planetary gear unit 14 performs a differential action among a first rotary element 25 to which a torque generated by the engine 11 is applied, a second rotary element 26 to which the output member 16 is connected, and a third rotary element 27. The second planetary gear unit 15 performs a differential action among a fourth rotary element 28 to which the first motor 12 is connected, a fifth rotary element 29 connected to the third rotary element 27, and a sixth rotary element 30.

The first clutch CL1 selectively connects one of the rotary elements of the first planetary gear unit 14 and one of the rotary elements of the second planetary gear unit 15. In the example illustrated in FIG. 1, the first clutch CL1 is provided to selectively connect the first rotary element 25 and the sixth rotary element 30. As a result of engaging the first clutch CL1 to connect the first rotary element 25 and the sixth rotary element 30, the first planetary gear unit and the second planetary gear unit are connected to each other to form a complex planetary gear unit. To this end, alternatively, the second rotary element 26 and the sixth rotary element 30 may also be connected to each other by the first clutch CL1.

The second clutch CL2 selectively connects at least any two of the rotary elements of the second planetary gear unit 15 to integrally rotate all of the rotary elements of the second planetary gear unit 15. For example, the second clutch CL2 may be adapted to selectively connect the fourth rotary element 28 and the sixth rotary element 30, to connect the fourth rotary element 28 and the fifth rotary element 29, or to connect the fifth rotary element 29 and the sixth rotary element 30. In the drive unit 10, specifically, the second clutch CL2 selectively connects the fourth rotary element 28 and the sixth rotary element 30.

The brake BK is arranged between the first rotary element 25 and a fixed member 32 to selectively connect the first rotary element 25 and the fixed member 32. It should be noted that the brake BK may be omitted.

In the drive unit 10, the first clutch CL1 and the second clutch CL2 are manipulated hydraulically, and can adopt, for example, a friction type clutch such as a wet type multiple disc clutch, a dog clutch or the like. Similarly, the brake BK is manipulated hydraulically and can adopt, for example, a friction type brake, a dog brake or the like. The hydraulic controller 21 individually manipulates a hydraulic supply to the first clutch CL1, the second clutch CL2, and the brake BK according to a command value transmitted from the HV_ECU 22.

A vehicle speed sensor 34, an accelerator sensor 35, an MG1 speed sensor 36, an MG2 speed sensor 37, an output shaft speed sensor 38, and a battery sensor 31 are individually connected to the HV_ECU 22. In other words, the HV_ECU 22 receives information about a depression of the accelerator, a vehicle speed, an output speed of the first motor 12, an output speed of the second motor 13, a speed of the output member 16, and a state of charge level (to be abbreviated as the "SOC" hereinafter) of the battery 33 and so on. In order to manipulate the engine 11, the first motor 12, the second motor 13 and the like based on the information, the HV_ECU 22 transmits command signals to the hydraulic controller 21, the ENG_ECU 23, and the MG_ECU 24. The ENG_ECU 23 manipulates the engine 11 or the like based on the command signal sent from the HV_ECU 22, and the MG_ECU 24 manipulates the PCU 20 based on the command signal sent from the HV_ECU 22.

The PCU 20 includes a converter 39 and an inverter 40 that perform a power conversion among the battery 33, the first motor 12, and the second motor 13. Specifically, the PCU 20 is configured to accumulate electric power generated from the first motor 12 and the second motor 13 in the battery 33, and to supply electric power to the first motor 12 and the second motor 13 to drive the first motor 12 and the second motor 13.

First Embodiment

Figures 2, 3:
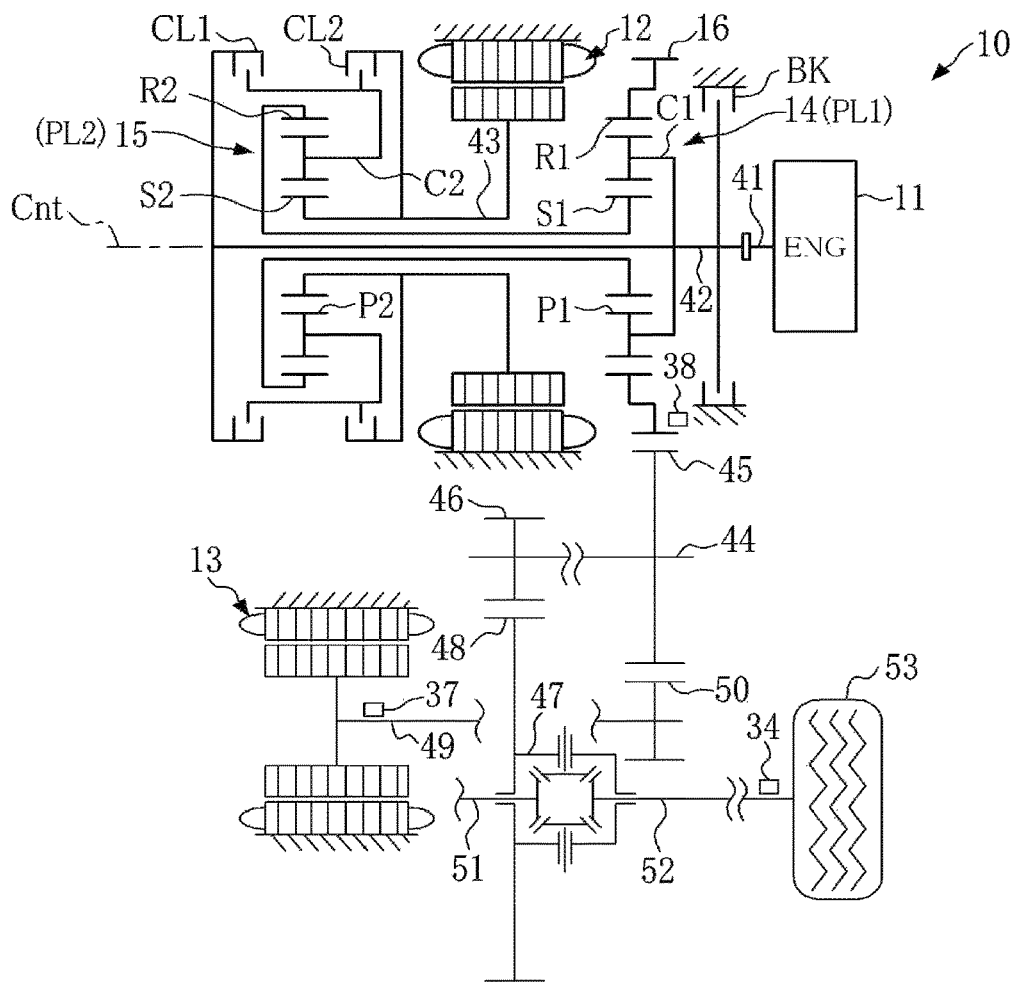
FIG. 2 is a skeleton diagram illustrating a drive unit according to a first embodiment.
FIG. 3 is a table indicating the operating modes selectable in the drive unit illustrated in FIG. 2.

FIG. 2 illustrates the drive unit 10 shown in FIG. 1 in more detail. The drive unit 10 illustrated in FIG. 2 is a multiple-shaft type drive unit in which a rotor 49 of a second motor 13 is disposed on a different axis from an input shaft 42 of a first planetary gear unit 14. Drive unit 10 includes an engine 11, a first motor 12, the second motor 13, the first planetary gear unit 14, the second planetary gear unit 15, the first clutch CL1, the second clutch CL2, the brake BK, a differential gear unit 47, and a pair of drive wheels 53. The drive unit 10 illustrated in FIG. 2 is, for example, configured to be suitable for vehicles, in which the engine is mounted transversely, such as a front engine/front drive vehicle (FF-layout vehicle) or a rear engine/rear drive vehicle (RR vehicle). As illustrated in FIG. 2, the clutch CL1 and CL2 are disposed on an opposite side of the engine 11 in a width direction of the vehicle across the first motor 12.

The first planetary gear unit 14 is a single-pinion planetary gear unit that is adapted to perform a differential action among a first sun gear S1, a first carrier C1, and a first ring gear R1 as an internal gear arranged concentrically with the first sun gear S1. The first carrier C1 rotatably supports a plurality of first pinion gears P1 interposed between the first sun gear S1 and the first ring gear R1.

The input shaft 42 of the first planetary gear unit 14 is connected to an output shaft 41 of the engine 11. The first carrier C1 is connected to the input shaft 42. Therefore, a drive torque generated by the engine 11 is delivered to the first carrier C1. It should be noted that the first carrier C1 and the input shaft 42 may be connected to each other via a transmission unit such as a gear unit. Optionally, the output shaft 41 and the input shaft 42 may be connected to each other via a unit such as a damper unit or a torque converter. The first planetary gear unit 14 is disposed on an axis Cnt in common with an axis of the output shaft 41 of the engine 11. An output member 16 is connected to the first ring gear R1. In the first planetary gear unit 14, accordingly, the first carrier C1 serves as the first rotary element 25, the first ring gear R1 serves as the second rotary element 26, and the first sun gear S1 serves as the third rotary element 27.

The second planetary gear unit 15 is a single-pinion planetary gear unit that is adapted to perform a differential action among three rotary elements. Specifically, the second planetary gear unit 15 includes: a second sun gear S2 that is connected to a rotor 43 of the first motor 12; a second ring gear R2 as an internal gear arranged concentrically with the second sun gear S2 while being connected to the first sun gear S1; a plurality of second pinion gears P2 interposed between the second sun gear S2 and the second ring gear R2; and a second carrier C2 that rotatably supports the second pinion gears P2. In the second planetary gear unit 15, accordingly, the second sun gear S2 serves as the fourth rotary element 28, the second ring gear R2 serves as the fifth rotary element 29, and the second carrier C2 serves as the sixth rotary element 30.

The first carrier C1 and the second carrier C2 are selectively connected to each other by manipulating the first clutch CL1 as the first engagement device. For example, the first planetary gear unit 14 and the second planetary gear unit 15 are connected to each other by engaging the first clutch CL1 to form a complex planetary gear unit, and power can be distributed in accordance with a power split ratio of the complex planetary gear unit. The second carrier C2 and the second sun gear S2 are selectively connected to each other by manipulating the second clutch CL2 as the second engagement device. For example, the second carrier C2 and the second sun gear S2 are connected to each other by engaging the second clutch CL2, so that the differential action of the second planetary gear unit 15 is restricted. The brake BK as a third engagement device includes a one-way clutch that prevents a reverse rotation of the output shaft 41 of the engine 11, and the input shaft 42 and the fixed member 32 are selectively connected to each other by manipulating the brake BK.

In the drive unit 10, a counter shaft 44 extends in parallel with the shaft line Cnt. A driven gear 45 is fitted onto one end portion of the counter shaft 44 while being meshed with the output member 16, and a drive gear 46 is fitted onto the other end portion of the counter shaft 44 while being meshed with a ring gear 48 of a differential gear unit 47 as a final reduction. The driven gear 45 is also meshed with a drive gear 50 fitted onto the rotor 49 of the second motor 13 so that a drive torque generated by the second motor 13 is added to a drive torque transmitted through the output member 16 at the driven gear 45. The drive torque thus synthesized is delivered to the drive wheels 53 from the differential gear unit 47 through drive shafts 51 and 52.

FIG. 3 is a table indicating an operating mode selectable in the drive unit 10 illustrated in FIG. 2. The operating mode of the drive unit 10 can be shifted among first to six modes by manipulating the first clutch CL1, the second clutch CL2, the brake BK, the engine 11, the first motor 12, and the second motor 13 by the HV_ECU 22. In FIG. 3, "X" represents disengagement of the engagement devices and "O" represents engagement or application of the engagement devices. Further, "-" represents that the brake BK may be not only engaged but also disengaged.

The first mode (referred to as EV Lo in the drawings) is a dual-motor mode that is selected when the vehicle speed is high and the required drive force is large during propulsion in an electric vehicle modes (to be abbreviated as the "EV mode" hereinafter). In the first mode, the vehicle is propelled by the drive torques generated by the first motor 12 and the second motor 13. Specifically, the first mode is established by engaging the first clutch CL1 and the brake BK while disengaging the second clutch CL2. The first mode is a low mode of an EV mode in which a multiplying factor of the torque delivered from the first motor 12 to the output member 16 is larger than that in the third mode to be described below.

The second mode (referred to as EV Free in the drawings) is a single-motor mode that is selected when the vehicle speed is low and the required drive force is small during propulsion in the EV mode. In the second mode, the vehicle is propelled by the drive torque generated by the second motor 13. In principle, the second mode is established by disengaging the first clutch CL1, the second clutch CL2, and the brake BK. In the second mode, since the delivery of the torque from the first planetary gear unit 14 and the second planetary gear unit 15 is interrupted, the torque is not applied to the first motor 12. When the operating mode is expected to be shifted to the first mode described above or the third mode to be described below, any one of the first clutch CL1 and the second clutch CL2, and the brake BK may be engaged.

The third mode (referred to as EV Hi in the drawings) is a high mode of a dual-motor mode in which the multiplying factor of the torque delivered from the first motor 12 to the output member 16 is smaller than that in the first mode. Specifically, the third mode is established by disengaging the first clutch CL1 while engaging the second clutch CL2 and the brake BK.

The fourth mode (referred to as HV Lo in the drawings) is a low mode of a hybrid mode (to be abbreviated as the "HV mode" hereinafter), and is established by engaging only the first clutch CL1. Specifically, in the fourth mode, the second motor 13 is operated as a motor while being rotated in a direction to increase a rotational speed thereof so as to generate a torque for propelling the vehicle in the forward direction. In this situation, the first motor 12 establishes a reaction torque for delivering a drive torque generated by the engine 11 to the drive wheel 53 through the complex planetary gear unit. When the direction of the reaction torque is a direction in which the speed of the first motor 12 is increased, the first motor 12 serves as the motor, and when the direction of the reaction torque is a direction in which the speed of the first motor 12 is reduced, the first motor 12 servers as a generator. The fourth mode is referred to as the low mode herein since an engine speed is increased higher than the speed of the output member 16 when the speed of the first motor 12 is reduced to zero.

The fifth mode (referred to as HV Fix in the drawings) is a fixed mode of the hybrid mode, and is established by engaging the first clutch CL1 and the second clutch CL2 while disengaging the brake BK. In the fifth mode, all of the rotary elements in the complex planetary gear unit are rotated at a same speed, and a gear ratio of the complex planetary gear unit becomes "1". That is, the torque generated by the engine 11 is transmitted through the complex planetary gear unit without being changed.

The sixth mode (referred to as HV Hi in the drawings) is a high mode of the hybrid mode, and is established by engaging only the second clutch CL2. In the sixth mode, the second motor 13 is operated as a motor while being rotated in a direction to increase a rotational speed thereof so as to generate a torque for propelling the vehicle in the forward direction. In this situation, as in the fourth mode, the first motor 12 establishes a reaction torque for delivering the drive torque generated by the engine 11 to the drive wheel 53 through the complex planetary gear unit, and may serve as the motor or the generator depending on the direction of the reaction torque. The sixth mode is referred to as the high mode herein since the engine speed is reduced lower than that of the output member 16 when the speed of the first motor 12 is reduced to zero.

Figure 4:
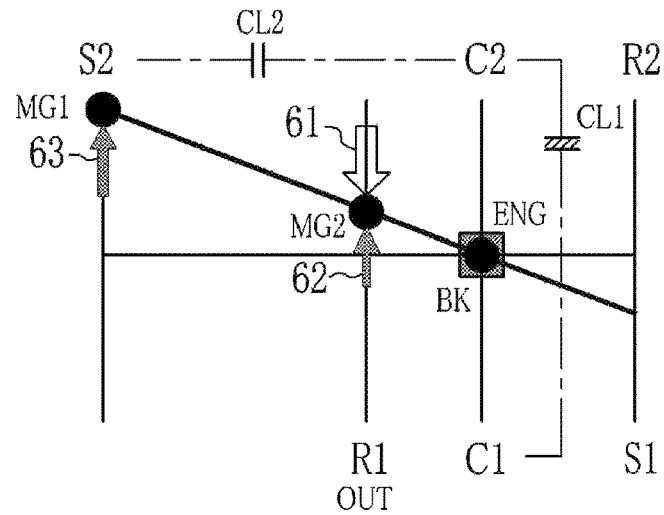
FIG. 4 is a nomographic diagram indicating a condition in a first mode shown in FIG. 3.

FIG. 4 indicates an operating condition of the complex planetary gear unit in the first mode. It should be noted that in nomographic diagrams to be described below, including FIG. 4, the longitudinal axes represent connection between the rotary elements in the complex planetary gear unit, and each distance between the longitudinal axes represents a gear ratio. Further, a vertical distance from a transverse base line in these longitudinal axes represents the speeds of the rotary elements.

As described above, the first mode is established by engaging the first clutch CL1 and the brake BK while disengaging the second clutch CL2. Specifically, the first sun gear S1 of the first planetary gear unit 14 and the second ring gear R2 of the second planetary gear unit 15 are connected to each other, and the first carrier C1 and the second carrier C2 are connected to each other by engaging the first clutch CL1. As a result, the first sun gear S1 and the second ring gear R2 rotate at the same speed, and the first carrier C1 and the second carrier C2 rotate at the same speed.

In the first mode, since the first clutch CL1 and the brake BK are engaged with each other, the first carrier C1 and the second carrier C2 are not allowed to rotate. As a result, the rotation of the output shaft 41 of the engine 11 stops. In this situation, the first motor 12 and the second motor 13 are operated by electric power supplied from the battery 33 to generate the drive torques. In other words, the first motor 12 and the second motor 13 serve as motors. In this situation, a running resistance against the vehicle acts in a direction to reduce the speed of the first ring gear R1 as indicated by the arrow 61. By contrast, a synthesized torque of the drive torque of the second motor 13 indicated by the arrow 62 and the drive torque of the first motor 12 indicated by the arrow 63 is applied in a direction to increase the speed of the first ring gear R1 (i.e., counter direction to the arrow 61). It should be noted that in the first mode, the first motor 12 rotates in the same direction as the first ring gear R1 and the rotor 49 of the second motor 13. In the first mode, the speed of the output member 16 is lower than that of the rotor 43 of the first motor 12. In other words, the output torque of the first motor 12 is increased and delivered to the output member 16. Since the output torque of the first motor 12 is synthesized with the output torque of the second motor 13 in the first mode, the larger drive force can be established in the first mode than that in the second mode in which the vehicle is operated only by the output torque of the second motor 13. In addition, since the engine 11 is stopped in the first mode, it is possible to reduce fuel consumption.

Figure 5:
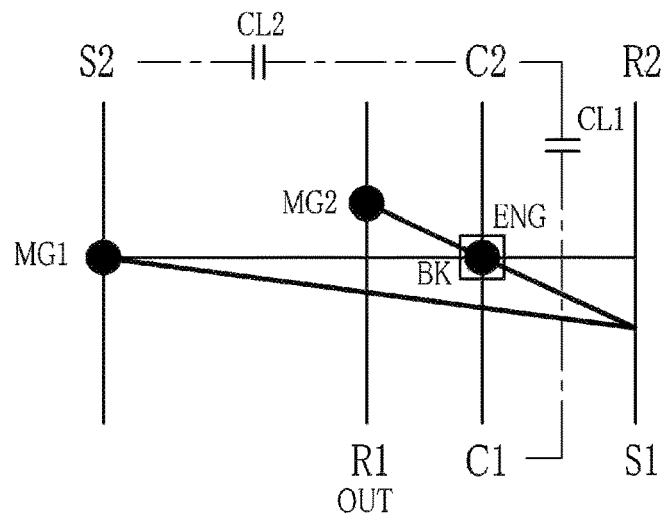
FIG. 5 is a nomographic diagram indicating a condition in a second mode shown in FIG. 3.

FIG. 5 indicates an operating condition of the complex planetary gear unit in the second mode. As described above, the second mode is established by disengaging the first clutch CL1, the second clutch CL2, and the brake BK. In the second mode, the drive torques are not generated by the engine 11 and the first motor 12. Therefore, an inertia torque or a friction torque of the engine 11 acts on the first carrier C1 or the second carrier C2, and an inertia torque or a friction torque of the first motor 12 acts on the second sun gear S2. In this situation, an inertia torque of the second ring gear R2 is smaller than the inertia torque of the engine 11 or the first motor 12. Therefore, the load acting on the engine 11 or the first motor 12 can be reduced. Therefore, the second ring gear R2 is idled by stopping the rotations of the first carrier C1, the second carrier C2 and the second sun gear S2. In other words, in the second mode, it is possible to operate the vehicle without rotating the first motor 12 passively to reduce the electric power consumption. It should be noted that in the second mode, the brake BK may be engaged.

Figure 6:
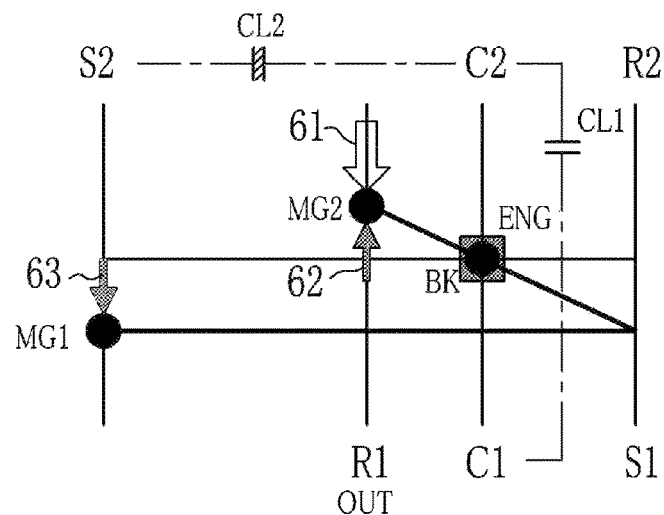
FIG. 6 is a nomographic diagram indicating a condition in a third mode shown in FIG. 3.

FIG. 6 indicates an operating condition of the complex planetary gear unit in the third mode. As described above, the third mode is established by disengaging the first clutch CL1 and engaging the second clutch CL2 and the brake BK. Therefore, the rotary elements of the second planetary gear unit 15 are rotated integrally. As in the first mode, the running resistance against the vehicle acts in the direction to reduce the speed of the first ring gear R1 as indicated by the arrow 61. By contrast, the synthesized torque of the drive torque of the second motor 13 indicated by the arrow 62 and the drive torque of the first motor 12 indicated by the arrow 63 is applied in a direction to increase the speed of the first ring gear R1 (i.e., counter direction to the arrow 61 in the drawings). It should be noted that in the third mode, since the first motor 12 rotates in a counter direction to the first ring gear R1, the direction of the output torque of the first motor 12 also becomes the counter direction to the first mode.

As in the first mode, the third mode is selected when the vehicle speed is high and the required drive force is large. In the third mode, the speed of the output member 16 is lower than that of the rotor 43 of the first motor 12. In the third mode, a speed ratio of the rotor 43 of the first motor 12 to the speed of the output member 16 is smaller than that in the first mode. By contrast, in the third mode, the multiplying factor of the torque to be delivered from the first motor 12 to the output member 16 is smaller than that in the first mode. Since the output torque of the first motor 12 is synthesized with the output torque of the second motor 13 in the third mode, the larger drive force can be established in the third mode than that established in the second mode in which the vehicle is operated only by the output torque of the second motor 13. Since the engine 11 is stopped, the fuel consumption may also be reduced in the third mode.

Figure 7:
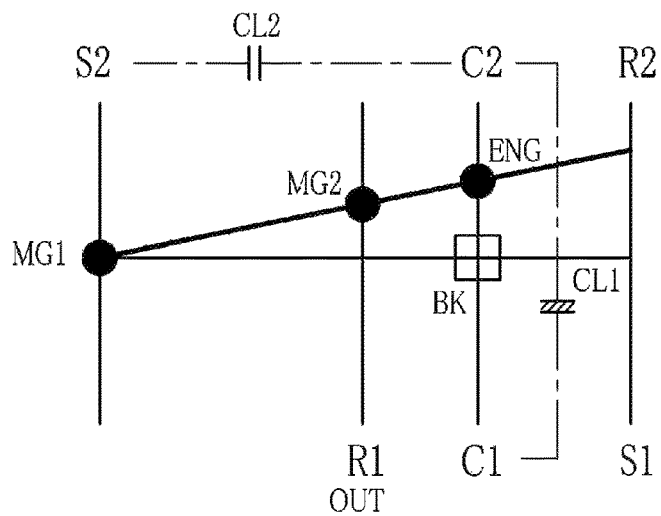
FIG. 7 is a nomographic diagram indicating a condition in a fourth mode shown in FIG. 3.

FIG. 7 indicates an operating condition of the complex planetary gear unit in the fourth mode. As described above, the fourth mode is established by engaging the first clutch CL1 while disengaging the second clutch CL2 and the brake BK.

In the fourth mode, the first sun gear S1 and the second ring gear R2 are connected to each other, and the first carrier C1 and the second carrier C2 are connected to each other by engaging the first clutch CL. As a result, the first sun gear S1 and the second ring gear R2 are rotated at the same speed, and the first carrier C1 and the second carrier C2 are rotated at the same speed. By engaging the first clutch CL1, the first planetary gear unit 14 and the second planetary gear unit 15 are connected to each other to form a complex planetary gear unit in which the first carrier C1 or the second carrier C2 serves as an input element, the second sun gear S2 serves as a reaction element, and the first ring gear R1 serves as an output element.

Therefore, in the fourth mode, the drive torque generated by the engine 11 is distributed to the first motor 12 and the output member 16 through the complex planetary gear unit. In this case, the reaction torque is established by the first motor 12 so that the speed of the engine 11 reaches a target speed. When the first motor 12 serves as the generator while establishing the reaction torque, the generated electric power is supplied to the second motor 13 to operate the second motor 13 as a motor to generate the drive torque. The drive torque generated by the second motor 13 is synthesized with the torque delivered from the engine 11 to the output member 16 through the complex planetary gear unit. In the situation shown in FIG. 7, the speed of the first motor 12 is reduced to zero, and hence the first motor 12 does not serve as a generator.

Figure 8:
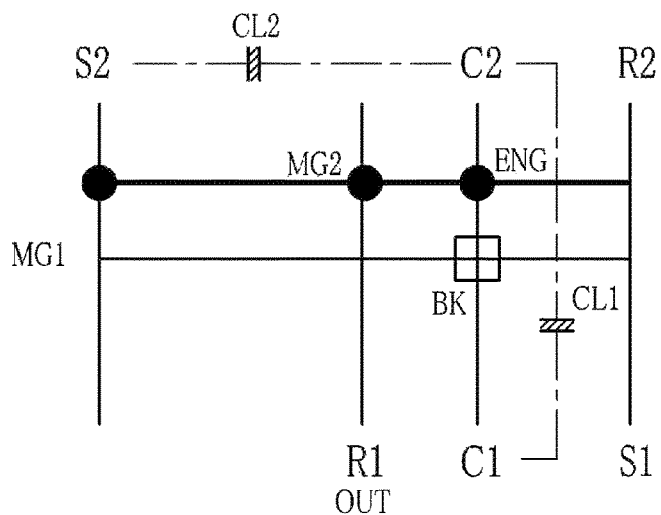
FIG. 8 is a nomographic diagram indicating a condition in a fifth mode shown in FIG. 3.

FIG. 8 indicates an operating condition of the complex planetary gear unit in the fifth mode. As described above, in the fifth mode, the gear ratio of the complex planetary gear unit is "1", and the torque generated by the engine 11 is transmitted through the complex planetary gear unit without being changed. In other words, it is not necessary to establish the reaction torque by the first motor 12. Therefore, in the fifth mode, it is possible to generate the drive torque only by the engine 11 to propel the vehicle, or it is possible to propel the vehicle by generating the drive torque by at least any one of the first motor 12 and the second motor 13 in addition to the engine 11. In the fifth mode, any one of the first motor 12 and the second motor 13 may serve as the generator depending on the situation to convert the power generated by the engine 11 partially into electric power to be supplied to the battery 33.

Figure 9:
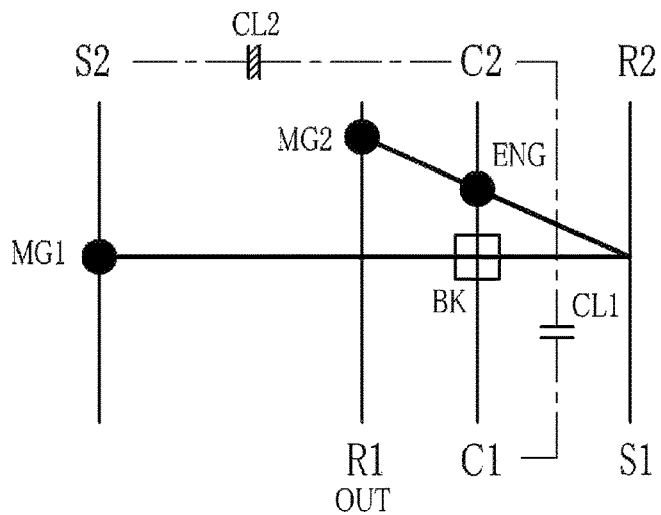
FIG. 9 is a nomographic diagram indicating a condition in a sixth mode shown in FIG. 3.

FIG. 9 indicates an operating condition of the complex planetary gear unit in the sixth mode. As described above, the sixth mode is established by engaging the second clutch CL2 while disengaging the first clutch CL1 and the brake BK. Therefore, all of the rotary elements of the second planetary gear unit 15 are rotated at the same speed. In other words, the output torque of the first motor 12 is delivered to the first sun gear S1 without being changed. That is, in the sixth mode, only the first planetary gear unit 14 performs the differential action. Specifically, in the complex planetary gear unit, the first carrier C1 serves as the input element, the first sun gear S1 serves as the reaction element, and the first ring gear R1 serves as the output element. Therefore, in the sixth mode, the drive torque generated by the second motor 13 is synthesized with the torque delivered to the output member 16 from the engine 11 through the complex planetary gear unit, and the vehicle can be propelled by the synthesized torque. In the situation shown in FIG. 9, the speed of the first motor 12 is reduced to zero, and hence the first motor 12 does not serve as the generator.

Figure 10:
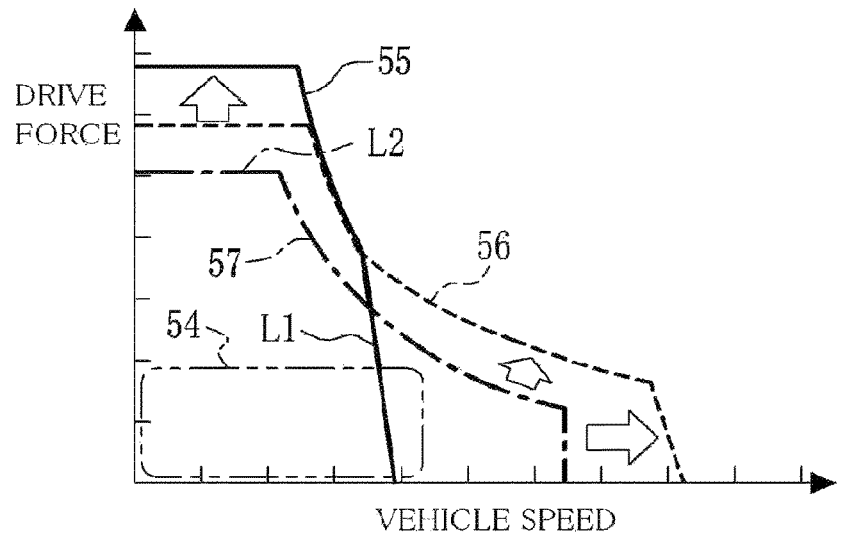
FIG. 10 is a diagram for explaining an example of operating ranges in the first mode and the third mode.

FIG. 10 indicates operating ranges in which the vehicle can be operated in the first mode and the third mode. In FIG. 10, the transverse axis represents the vehicle speed, and the longitudinal axis represents the drive force (output torque). The drive force is calculated on the basis of the required torque or the target torque governed by an accelerator position, and an operating condition or an operating environment or the like. In the first mode, the vehicle can be operated at an operating point within a range (hereinafter, referred to as a low mode range) 55 enclosed by a solid line, and in the third mode, the vehicle can be operated at an operating point within a range (hereinafter, referred to as a high mode range) 56 enclosed by a dashed line. The high mode range 56 includes a speed range higher than the line L1. In other words, the larger drive force can be generated in the third mode than that generated in the first mode up to a high vehicle speed. This is because, in the third mode, the multiplying factor of the torque delivered from the first motor 12 to the output member 16 is smaller than that in the first mode.

On the other hand, the low mode range 55 includes a drive force range higher than that the line L2. That is, in the first mode, the larger drive force can be generated than that in the third mode at the low vehicle speed. This is because, the speed of the first motor 12 with respect to the vehicle speed is lower in the first mode than that of the third mode, and hence the drive force can be generated to a higher vehicle speed. In other words, the multiplication factor of the output torque of the first motor 12 can be increased in the first mode. That is, the multiplying factor of the output torque generated by the first motor 12 can be changed among the first mode to the third mode. Therefore, in the dual-motor mode, the drive force range may be widened larger than that in the single-motor mode (i.e., the second mode). In FIG. 10, a range 57 in which the vehicle can be operated in the second mode is enclosed by a dotted-dashed line, and a range 54 enclosed by a two-dotted-dashed line is a range in which the clutches CL1, CL2 and the brake BK are disengaged in the second mode to propel the vehicle. In the range 57, the remaining range outside of the range 54 any one of the clutches CL1, CL2 and the brake BK are engaged to propel the vehicle only by the drive torque of the second motor 13.

Figure 11:
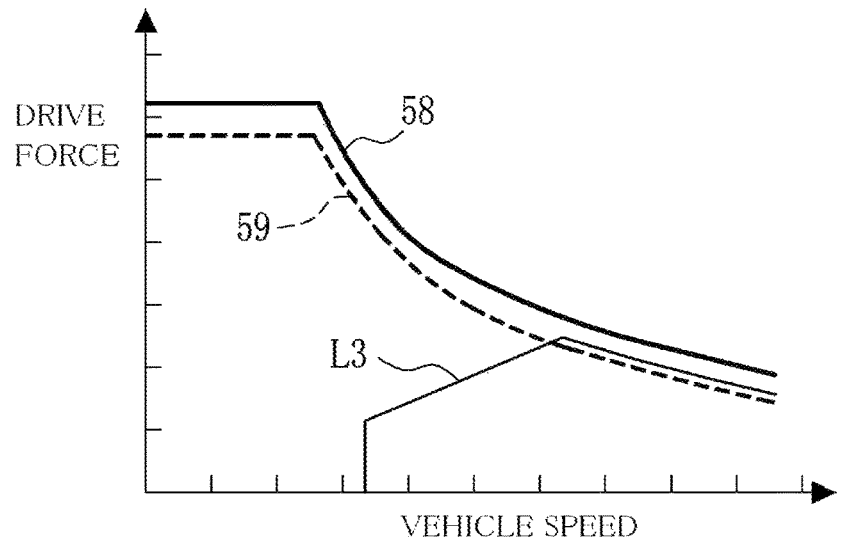
FIG. 11 is a diagram for explaining an example of operating ranges in the fourth mode, the fifth mode, and the sixth mode.

FIG. 11 indicates the operating ranges of the vehicle in the fourth mode, the fifth mode, and the sixth mode. In FIG. 11, the transverse axis represents the vehicle speed, and the longitudinal axis represents the drive force (output torque). The drive force can be calculated similar to the example described in FIG. 10. In the fourth mode, the vehicle can be operated within a range 58 (hereinafter, indicated as the low mode range) enclosed by a solid line. In the fifth mode, the vehicle can be operated within a range (hereinafter, indicated as a fixed mode range) L3 enclosed by a solid line. In the sixth mode, the vehicle can be operated within a range (hereinafter, indicated as the high mode range) 59 enclosed by a dotted line. These operating modes are selected in consideration of transmission efficiency of power of the drive unit 10, efficiency of the battery 33 or the like. Therefore, in the HV mode, it is possible to reduce the fuel consumption of the vehicle.

Second Embodiment

In a drive unit 10 according to a second embodiment, a second sun gear S2 is connected to a first sun gear S1, a first carrier C1 and a second carrier C2 are selectively connected to each other, the second carrier C2 and a second ring gear R2 are selectively connected to each other, an engine 11 is connected to the first carrier C1, a first motor 12 is connected to the second ring gear R2, and a second motor 13 is connected to a first ring gear R1.

In the second embodiment, the first carrier C1 serves as the first rotary element 25 shown in FIG. 1, the first ring gear R1 serves as the second rotary element 26 shown in FIG. 1, the first sun gear S1 serves as the third rotary element 27 shown in FIG. 1, the second ring gear R2 serves as the fourth rotary element 28 shown in FIG. 1, the second sun gear S2 serves as the fifth rotary element 29, and the second carrier C2 serves as the sixth rotary element 30 shown in FIG. 1.

In the second embodiment, the first clutch CL1 selectively connects the first carrier C1 and the second carrier C2. The second clutch CL2 selectively connects the second carrier C2 and the second ring gear R2. The brake BK selectively connects the first carrier C1 (or input shaft 42) and a fixed member 32.

In the drive unit 10 according to the second embodiment, the second mode can be established by disengaging the first clutch CL1, the second clutch CL2, and the brake BK. FIG.

Figure 12:
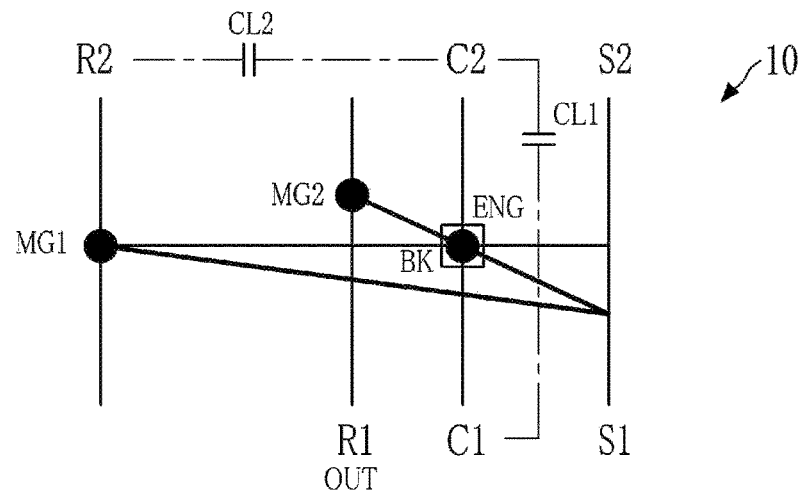
FIG. 12 is a nomographic diagram indicating a condition in a second mode in a drive unit according to a second embodiment.

12 indicates the operating condition of the complex planetary gear unit of the drive unit 10 according to the second embodiment in the second mode. As indicated in FIGS. 5 and 12, in the second mode, the operating condition of the complex planetary gear unit of the drive unit 10 according to the first embodiment is similar to that of the complex planetary gear unit of the drive unit 10 according to the second embodiment. In addition, as the drive unit 10 according to the first embodiment, the first mode and the third to sixth modes are also available in the drive unit 10 according to the second embodiment.

Third Embodiment

In a drive unit 10 according to a third embodiment, a second ring gear R2 is connected to a first ring gear R1, a first carrier C1 and a second carrier C2 are selectively connected to each other, a second sun gear S2 and the second carrier C2 are selectively connected to each other, an engine 11 is connected to the first carrier C1, a first motor 12 is connected to the second sun gear S2, and a second motor 13 is connected to a first sun gear S1.

In other words, the first carrier C1 serves as the first rotary element 25 shown in FIG. 1, the first sun gear S1 serves as the second rotary element 26 shown in FIG. 1, the first ring gear R1 serves as the third rotary element 27 shown in FIG. 1, the second sun gear S2 serves as the fourth rotary element 28 shown in FIG. 1, the second ring gear R2 serves as the fifth rotary element 29, and the second carrier C2 serves as the sixth rotary element 30 shown in FIG. 1.

In the third embodiment, the first clutch CL1 selectively connects the first carrier C1 and the second carrier C2. The second clutch CL2 selectively connects the second sun gear S2 and the second carrier C2. The brake BK selectively connects the first carrier C1 and a fixed member 32.

Figure 13:
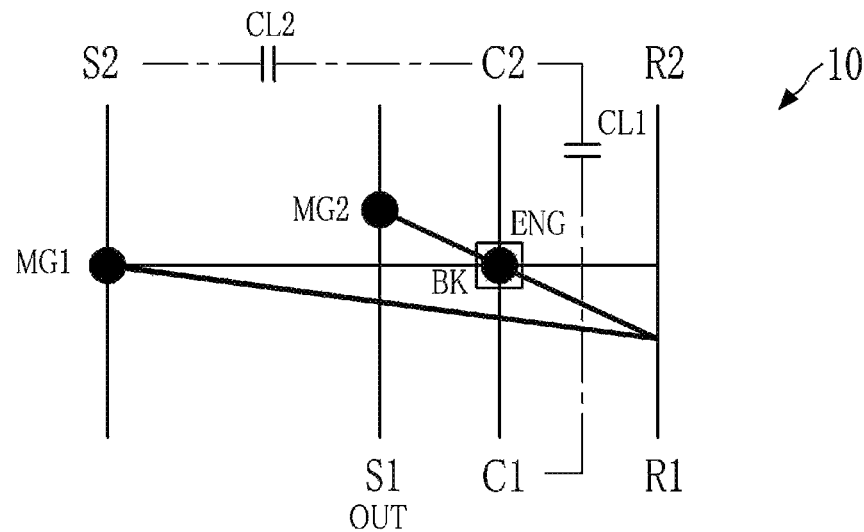
FIG. 13 is a nomographic diagram indicating a condition in a second mode in a drive unit according to a third embodiment.

In the drive unit 10 according to the third embodiment, a second mode can be established by disengaging the first clutch CL1, the second clutch CL2, and the brake BK. FIG. 13 indicates the operating condition of the complex planetary gear unit of the drive unit 10 according to the third embodiment in the second mode. As indicated in FIGS. 5 and 13, in the second mode, the operating condition of the complex planetary gear unit of the drive unit 10 according to the first embodiment is similar to that of the complex planetary gear unit of the drive unit 10 according to the third embodiment.

Fourth Embodiment

In a drive unit 10 according to a fourth embodiment, a second sun gear S2 is connected to a first ring gear R1, a first carrier C1 and a second carrier C2 are selectively connected to each other, the second carrier C2 and a second ring gear R2 are selectively connected to each other, an engine 11 is connected to the first carrier C1, a first motor 12 is connected to the second sun gear S2, and a second motor 13 is connected to a first sun gear S1.

In the fourth embodiment, the first carrier C1 serves as the first rotary element 25 shown in FIG. 1, the first sun gear S1 serves as the second rotary element 26 shown in FIG. 1, the first ring gear R1 serves as the third rotary element 27 shown in FIG. 1, the second ring gear R2 serves as the fourth rotary element 28 shown in FIG. 1, the second sun gear S2 serves as the fifth rotary element 29, and the second carrier C2 serves as the sixth rotary element 30 shown in FIG. 1.

In the fourth embodiment, the first clutch CL1 selectively connects the first carrier C1 and the second carrier C2. The second clutch CL2 selectively connects the second carrier C2 and the second ring gear R2. The brake BK selectively connects the first carrier C1 and a fixed member 32.

Figure 14:
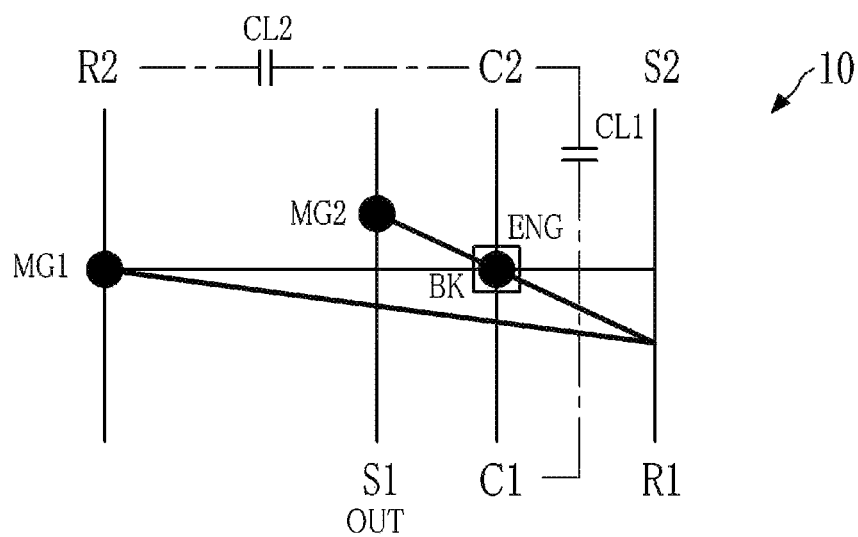
FIG. 14 is a nomographic diagram indicating a condition in a second mode in a drive unit according to a fourth embodiment.

In the drive unit 10 according to the fourth embodiment, a second mode can be established by disengaging the first clutch CL1, the second clutch CL2, and the brake BK. FIG. 14 indicates the operating condition of the complex planetary gear unit of the drive unit 10 according to the fourth embodiment in the second mode. As indicated in FIGS. 5 and 14, in the second mode, the operating condition of the complex planetary gear unit of the drive unit 10 according to the first embodiment is similar to that of the complex planetary gear unit of the drive unit 10 according to the fourth embodiment.

Fifth Embodiment

Figure 15:
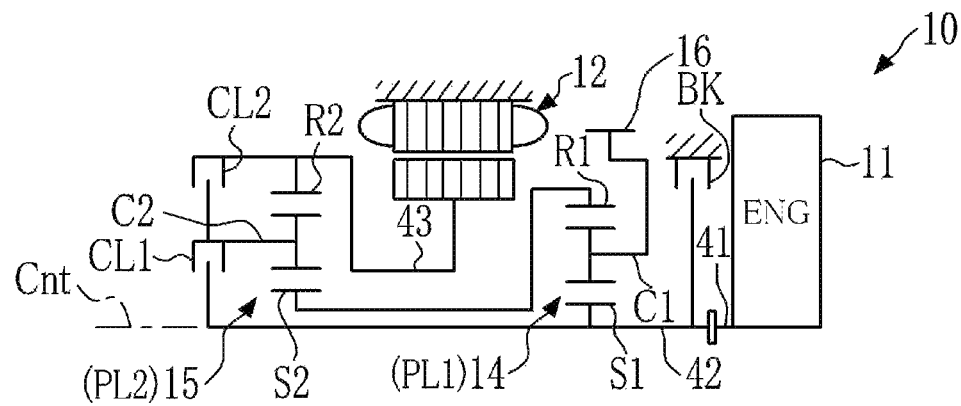
FIG. 15 is a skeleton diagram illustrating a drive unit according to a fifth embodiment.

FIG. 15 is a skeleton diagram illustrating a drive unit 10 according to a fifth embodiment. In the drive unit 10 according to the fifth embodiment, a first ring gear R1 and a second sun gear S2 are connected to each other, a first sun gear S1 and a second carrier C2 are selectively connected to each other, and the second carrier C2 and a second ring gear R2 are connected to each other. In addition, an engine 11 is connected to the first sun gear S1, a first motor 12 is connected to the second ring gear R2, and a second motor 13 is connected to the first carrier C1. In other words, the first sun gear S1 serves as the first rotary element 25 shown in FIG. 1, the first carrier C1 serves as the second rotary element 26 shown in FIG. 1, the first ring gear R1 serves as the third rotary element 27 shown in FIG. 1, the second ring gear R2 serves as the fourth rotary element 28 shown in FIG. 1, the second sun gear S2 serves as the fifth rotary element 29 shown in FIG. 1, and the second carrier C2 serves as the sixth rotary element 30 shown in FIG. 1.

In the fifth embodiment, the first clutch CL1 selectively connects the first sun gear S1 and the second carrier C2. the second clutch CL2 selectively connects the second carrier C2 and the second ring gear R2. the brake BK selectively connects the first sun gear S1 and a fixed member 32.

It should be noted that in FIG. 15, a power transmitting route including the second motor 13 from an output member 16 to a drive wheel 53 is similar to that the drive unit 10 illustrated in FIG. 2, and therefore a description thereof will be omitted. In addition, since the drive unit 10 according to the fifth embodiment is configured to be symmetric with respect to the same shaft line Cnt as an output shaft 41 of the engine 11, in FIG. 15, a lower half part of the shaft line Cnt is omitted.

FIG. 16 is a table indicating an operating mode selectable in the drive unit 10 illustrated in FIG. 15. The first mode established in the drive unit 10 illustrated in FIG. 15 is established by disengaging the first clutch CL1 while engaging the second clutch CL2 and the brake BK. The second mode is established by disengaging the first clutch CL1, the second clutch CL2, and the brake BK. The third mode is established by engaging the first clutch CL1 and the brake BK while disengaging the second clutch CL2. The fourth mode is established by disengaging the first clutch CL1 and the brake BK while engaging the second clutch CL2. The fifth mode is established by engaging the first clutch CL1 and the second clutch CL2 while disengaging the brake BK. The sixth mode is established by engaging only the first clutch CL1.

FIG. 17 indicates an operating condition of the complex planetary gear unit of the drive unit 10 illustrated in FIG. 15 in the first mode. As described above, all of the rotary elements of the second planetary gear unit 15 are rotated integrally by engaging the second clutch CL2. The running resistance against the vehicle acts in the direction to reduce the speed of the first carrier C1 as indicated by the arrow 61. By contrast, the synthesized torque of the drive torque of the second motor 13 indicated by the arrow 62 and the drive torque of the first motor 12 indicated by the arrow 63 is applied in the direction to increase the speed of the first carrier C1 (i.e., in the counter direction to the arrow 61). In the situation shown in FIG. 17, the first motor 12 rotates in the same direction as the first carrier C1 and the rotor 49 of the second motor 13. As illustrated in FIG. 17, in the first mode, the torque of the first motor 12 is amplified according to the gear ratio of the first planetary gear unit 14 and delivered to the first carrier C1.

FIG. 18 indicates the operating condition of the complex planetary gear unit of the drive unit 10 illustrated in FIG. 15 in the second mode. In the drive unit 10 illustrated in FIG. 15, the second mode is established by disengaging the first clutch CL1, the second clutch CL2, and the brake BK. In the second mode, the engine 11 and the first motor 12 are stopped, and the second motor 13 is operated as a motor. As indicated in FIGS. 5 and 18, in the second mode, the operating condition of the complex planetary gear unit of the drive unit 10 according to the first embodiment is similar to that of the complex planetary gear unit of the drive unit 10 according to the fifth embodiment.

Figure 19:
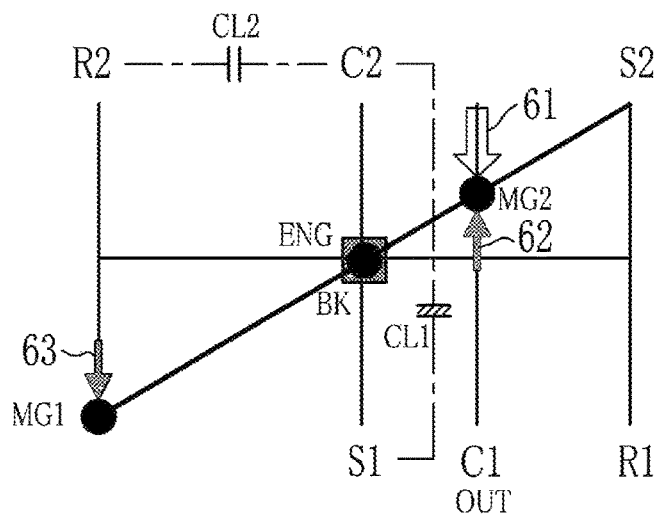
FIG. 19 is a nomographic diagram indicating a condition in a third mode shown in FIG. 16.

FIG. 19 indicates an operating condition of the complex planetary gear unit of the drive unit 10 illustrated in FIG. 15 in the third mode. In the drive unit 10 illustrated in FIG. 15, the third mode is established by engaging the first clutch CL1 and the brake BK while disengaging the second clutch CL2. Therefore, the first ring gear R1 and the second sun gear S2 are connected to each other to rotate the first ring gear R1 and the second sun gear S2 at the same speed. In this situation, the first clutch CL1 is engaged to connect the first sun gear S1 and the second carrier C2 so that the first sun gear S1 and the second carrier C2 are rotated at the same speed.

As indicated in FIG. 19, in the third mode, the running resistance against the vehicle acts in the direction to reduce the speed of the first carrier C1 as indicated by the arrow 61. By contrast, the synthesized torque of the drive torque of the second motor 13 indicated by the arrow 62 and the drive torque of the first motor 12 indicated by the arrow 63 is applied in the direction to increase the speed of the first carrier C1 (i.e., counter direction to the arrow 61). In the situation shown in FIG. 19, the first motor 12 is rotated in the counter direction to the first carrier C1 and the rotor 49 of the second motor 13. As indicated in FIG. 19, in the third mode, all of the rotary elements in the complex planetary gear unit are rotated differentially.

Figure 20:
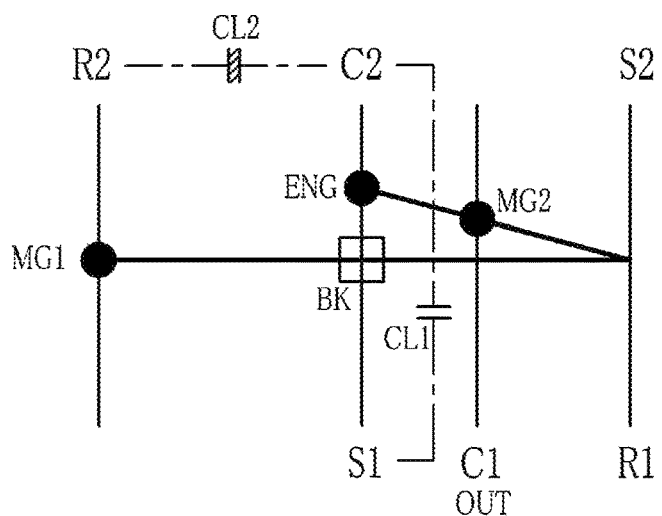
FIG. 20 is a nomographic diagram indicating a condition in a fourth mode shown in FIG. 16.

FIG. 20 indicates the operating condition of the complex planetary gear unit of the drive unit 10 illustrated in FIG. 15 in the fourth mode. In the drive unit 10 illustrated in FIG. 15, the fourth mode is established by engaging the second clutch CL2 while disengaging the brake BK and the first clutch CL1. In the fourth mode, the engine 11 is operated, the first motor 12 establishes the reaction torque, and the second motor 13 is operated as the motor. Therefore, the drive torque generated by the engine 11 and the drive torque generated by the second motor 13 are synthesized, and the vehicle is operated by the synthesized torque. As indicated in FIGS. 9 and 20, in the fourth mode, the operating condition of the complex planetary gear unit of the drive unit 10 according to the first embodiment is similar to that of the complex planetary gear unit of the drive unit 10 according to the fifth embodiment.

Figure 21:
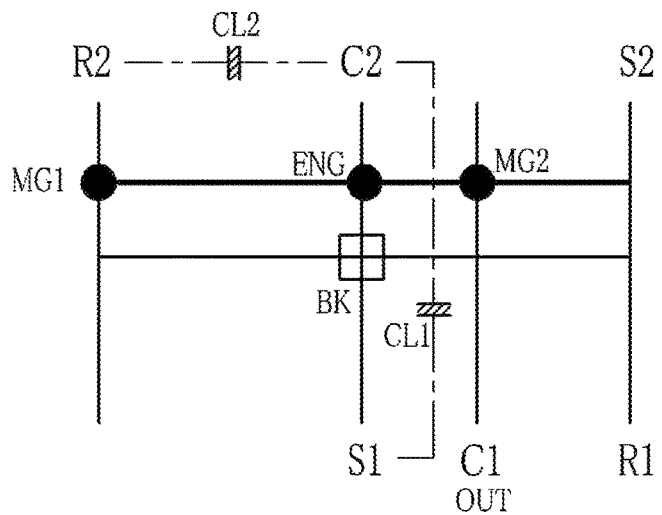
FIG. 21 is a nomographic diagram indicating a condition in a fifth mode shown in FIG. 16.

FIG. 21 indicates the operating condition of the complex planetary gear unit of the drive unit 10 illustrated in FIG. 15 in the fifth mode. In the drive unit 10 illustrated in FIG. 15, the fifth mode is established by engaging the first clutch CL1 and the second clutch CL2 while disengaging the brake BK. In the fifth mode, all of the rotary elements in the complex planetary gear unit are rotated integrally. Therefore, the torque generated by the engine 11 is transmitted through the complex planetary gear unit without being changed. As indicated in FIGS. 8 and 21, in the second mode, the operating condition of the complex planetary gear unit of the drive unit 10 according to the first embodiment is similar to that of the operating condition of the complex planetary gear unit of the drive unit 10 according to the fifth embodiment.

Figure 22:
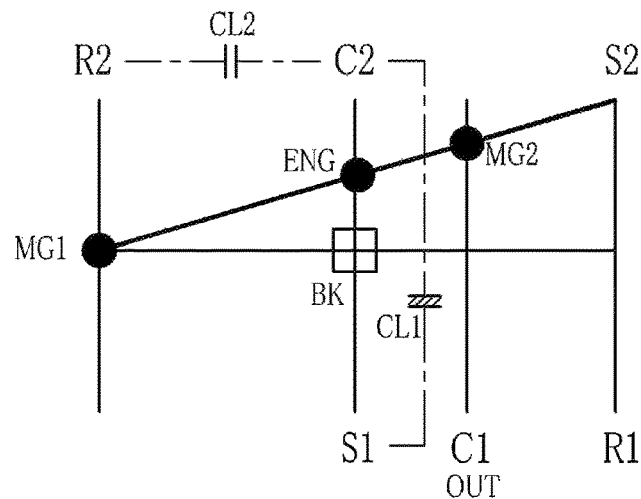
FIG. 22 is a nomographic diagram indicating a condition in a sixth mode shown in FIG. 16.

FIG. 22 indicates an operating condition of the complex planetary gear unit of the drive unit 10 illustrated in FIG. 15 in the sixth mode. In the drive unit 10 illustrated in FIG. 15, the sixth mode is established by engaging the first clutch CL1 while disengaging the second clutch CL2 and the brake BK. In the sixth mode, the engine 11 is operated, the first motor 12 establishes the reaction torque, and the second motor 13 is operated as the motor. Therefore, the drive torque generated by the engine 11 and the drive torque generated by the second motor 13 are synthesized, and the vehicle is operated by the synthesized torque. As indicated in FIG. 22, in the sixth mode, all of the rotary elements in the complex planetary gear unit are rotated differentially. As illustrated in FIGS. 7 and 22, in the fourth mode, the operating condition of the complex planetary gear unit of the drive unit 10 according to the first embodiment is similar to that of the complex planetary gear unit of the drive unit 10 according to the fifth embodiment.

Sixth Embodiment

In a drive unit 10 according to a sixth embodiment, a second ring gear R2 is connected to a first ring gear R1, a first sun gear S1 and a second carrier C2 are selectively connected to each other, a second sun gear S2 and the second carrier C2 are selectively connected to each other, an engine 11 is connected to the first sun gear S1, a first motor 12 is connected to the second sun gear S2, and a second motor 13 is connected to the second carrier C2. In other words, in the sixth embodiment, the first sun gear S1 serves as the first rotary element 25 in the drive unit 10 shown in FIG. 1, the first carrier C1 serves as the second rotary element 26 in the drive unit 10 shown in FIG. 1, the first ring gear R1 serves as the third rotary element 27 in the drive unit 10 shown in FIG. 1, the second sun gear S2 serves as the fourth rotary element 28 in the drive unit 10 shown in FIG. 1, the second ring gear R2 serves as the fifth rotary element 29 in the drive unit 10 shown in FIG. 1, and the second carrier C2 serves as the sixth rotary element 30 in the drive unit 10 shown in FIG. 1.

In the sixth embodiment, the first clutch CL1 selectively connects the first sun gear S1 and the second carrier C2, the second clutch CL2 selectively connects the second carrier C2 and the second sun gear S2, and the brake BK selectively connects the first sun gear S1 and a fixed member 32.

Figure 23:
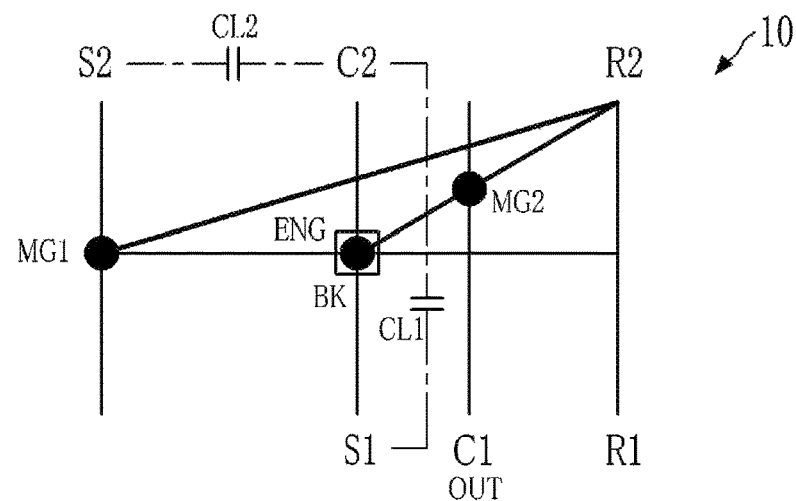
FIG. 23 is a nomographic diagram indicating a condition in a second mode in a drive unit according to a sixth embodiment.

In the drive unit 10 according to the sixth embodiment, a second mode is established by disengaging the first clutch CL1, the second clutch CL2, and the brake BK. FIG. 23 indicates the operating condition of the complex planetary gear unit of the drive unit 10 according to the sixth embodiment in the second mode. As indicated in FIGS. 5 and 23, in the second mode, the operating condition of the complex planetary gear unit of the drive unit 10 according to the sixth embodiment is similar to that of the operating condition of the complex planetary gear unit shown in FIG. 5. The operating conditions of the complex planetary gear unit of the drive unit 10 according to the sixth embodiment in the first mode and the third to sixth modes are similar to those shown in FIGS. 4 and 6 to 9.

Seventh Embodiment

In a drive unit 10 according to a seventh embodiment, a second sun gear S2 is connected to a first sun gear S1, a first ring gear R1 and a second carrier C2 are selectively connected to each other, the second sun gear S2 and the second carrier C2 are selectively connected to each other, an engine 11 is connected to the first ring gear R1, a first motor 12 is connected to a second ring gear R2, and a second motor 13 is connected to a first carrier C1.

In the seventh embodiment, the first ring gear R1 serves as the first rotary element 25 in the drive unit 10 shown in FIG. 1, the first carrier C1 serves as the second rotary element 26 in the drive unit 10 shown in FIG. 1, the first sun gear S1 serves as the third rotary element 27 in the drive unit 10 shown in FIG. 1, the second ring gear R2 serves as the fourth rotary element 28 in the drive unit 10 shown in FIG. 1, the second sun gear S2 serves as the fifth rotary element 29 in the drive unit 10 shown in FIG. 1, and the second carrier C2 serves as the sixth rotary element 30 in the drive unit 10 shown in FIG. 1.

In the seventh embodiment, the first clutch CL1 selectively connects the first ring gear R1 and the second carrier C2, the second clutch CL2 selectively connects the second carrier C2 and the second sun gear S2, and the brake BK selectively connects the first ring gear R1 and a fixed member 32.

Figure 24:
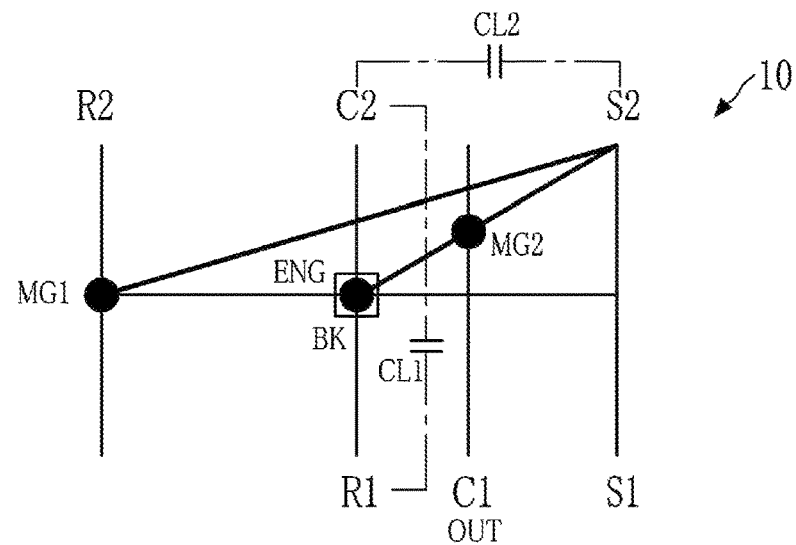
FIG. 24 is a nomographic diagram indicating a condition in a second mode in a drive unit according to a seventh embodiment.

In the drive unit 10 according to the seventh embodiment, a second mode can be established by disengaging the first clutch CL1, the second clutch CL2, and the brake BK. FIG. 24 indicates the operating condition of the complex planetary gear unit of the drive unit 10 according to the seventh embodiment in the second mode. As indicated in FIGS. 5 and 24, in the second mode, the operating condition of the complex planetary gear unit of the drive unit 10 according to the seventh embodiment is substantially the same as that shown in FIG. 5. The operating conditions of the complex planetary gear unit of the drive unit 10 according to the seventh embodiment in the first mode and the third to sixth modes are substantially the same as the operating conditions shown in FIGS. 4 and 6 to 9.

Eighth Embodiment

In a drive unit 10 according to an eighth embodiment, a second ring gear R2 is connected to a first sun gear S1, a first ring gear R1 and a second carrier C2 are selectively connected to each other, a second sun gear S2 and the second ring gear R2 are selectively connected to each other, an engine 11 is connected to the first ring gear R1, a first motor 12 is connected to the second sun gear S2, and a second motor 13 is connected to a first carrier C1.

In the eighth embodiment, the first ring gear R1 serves as the first rotary element 25 in the drive unit 10 shown in FIG. 1, the first carrier C1 serves as the second rotary element 26 in the drive unit 10 shown in FIG. 1, the first sun gear S1 serves as the third rotary element 27 in the drive unit 10 shown in FIG. 1, the second sun gear S2 serves as the fourth rotary element 28 in the drive unit 10 shown in FIG. 1, the second ring gear R2 serves as the fifth rotary element 29 in the drive unit 10 shown in FIG. 1, and the second carrier C2 serves as the sixth rotary element 30 in the drive unit 10 shown in FIG. 1.

In addition, in the eighth embodiment, a first clutch CL1 selectively connects the first ring gear R1 and the second carrier C2, a second clutch CL2 selectively connects the second sun gear S2 and the second ring gear R2, and a brake BK selectively connects the first ring gear R1 and a fixed member 32.

Figure 25:
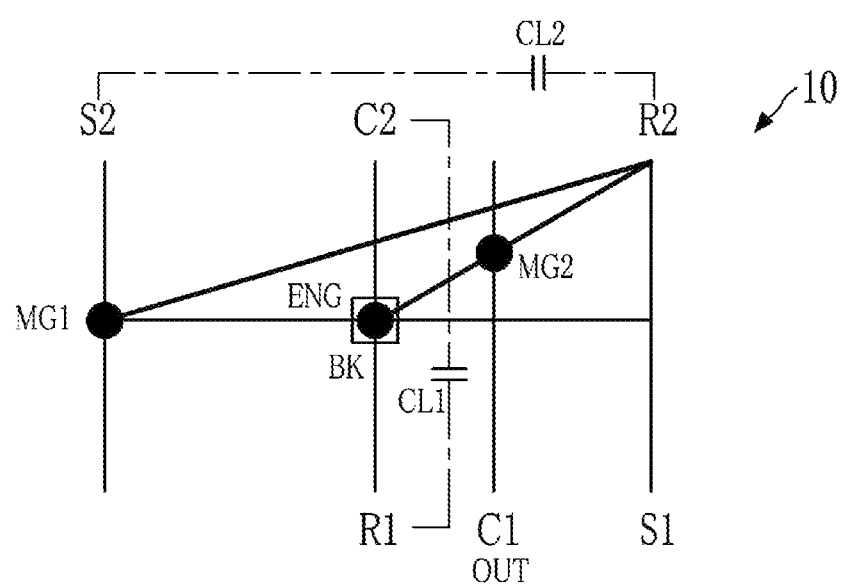
FIG. 25 is a nomographic diagram indicating a condition in a second mode in a drive unit according to an eighth embodiment.

In the drive unit 10 according to the eighth embodiment, the second mode can be established by disengaging the first clutch CL1, the second clutch CL2, and the brake BK. FIG. 25 indicates the operating condition of the complex planetary gear unit of the drive unit 10 according to the eighth embodiment in the second mode. As indicated in FIGS. 5 and 25, in the second mode, the operating condition of the complex planetary gear unit of the drive unit 10 according to the eighth embodiment is substantially the same as that shown in FIG. 5. The operating conditions of the complex planetary gear unit of the drive unit 10 according to the eighth embodiment in the first mode and the third to sixth modes are substantially the same as the operating conditions shown in FIGS. 4 and 6 to 9.

Figure 26:
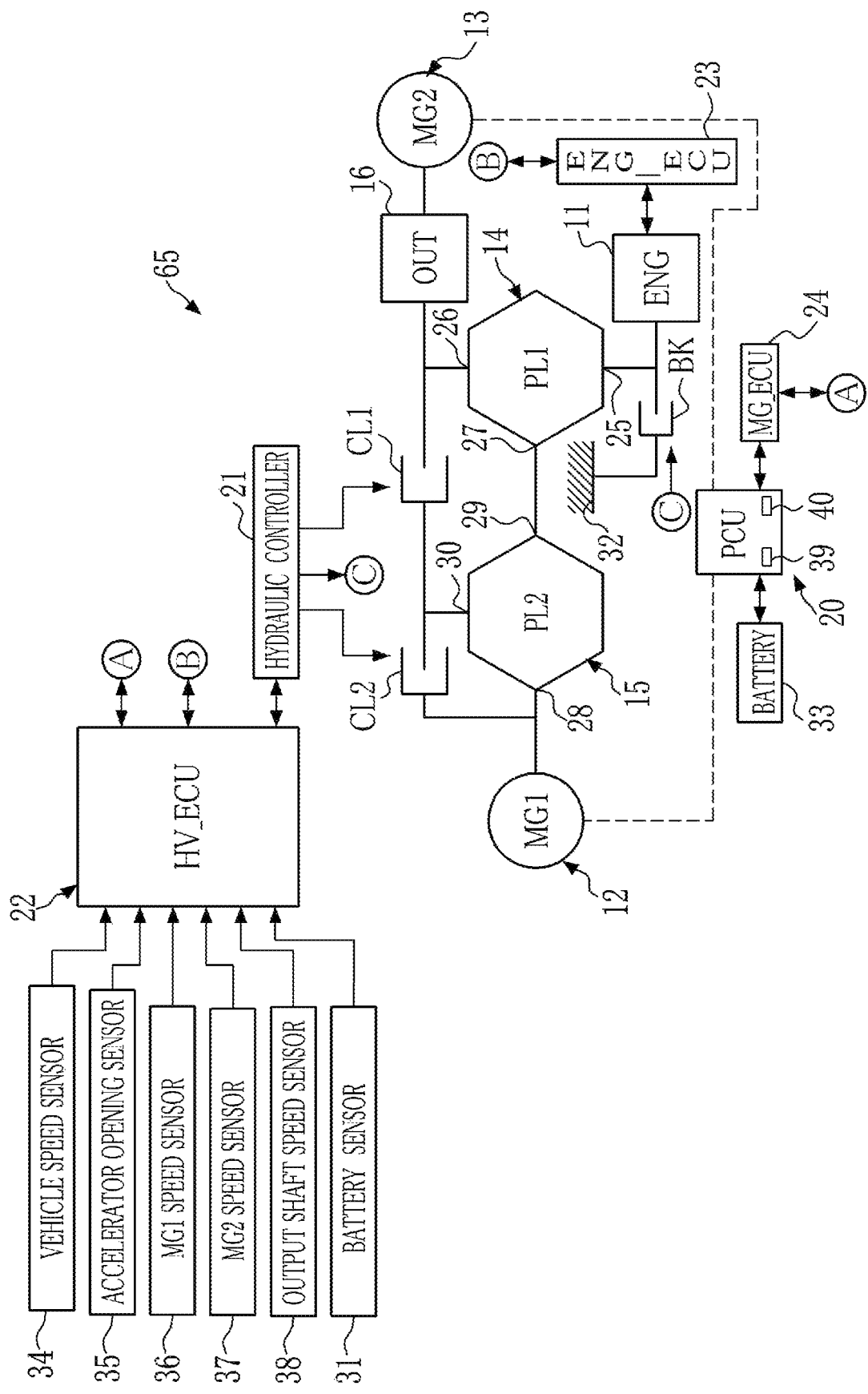
FIG. 26 is a block diagram conceptually illustrating a drive unit according to another embodiment of the present disclosure.

FIG. 26 conceptually illustrates a drive unit 65 according to a ninth embodiment to a sixteenth embodiment to be described below. Unlike the drive unit 10 illustrated in FIG. 1, in the drive unit 65 illustrated in FIG. 26, a first clutch CL1 selectively connects a second rotary element 26 and a sixth rotary element 30.

Ninth Embodiment

FIG. 27 is a skeleton diagram illustrating a drive unit 65 according to a ninth embodiment. In the drive unit 65, a first carrier C1 serves as a first rotary element 25 shown in FIG. 26, a first ring gear R1 serves as a second rotary element 26 shown in FIG. 26, a first sun gear S1 serves as a third rotary element 27 shown in FIG. 26, a second sun gear S2 serves as a fourth rotary element 28 shown in FIG. 26, a second ring gear R2 serves as a fifth rotary element 29 shown in FIG. 26, and a second carrier C2 serves as a sixth rotary element 30 shown in FIG. 26.

In the drive unit 65 according to the ninth embodiment, a first clutch CL1 selectively connects the first ring gear R1 and the second carrier C2, a second clutch CL2 selectively connects the second carrier C2 and the second ring gear R2, and a brake BK selectively connects the first carrier C1 and a fixed member 32. It should be noted that in FIG. 27, a power transmitting route including a second motor 13 from an output member 16 to a drive wheel 53 has a similar configuration to the drive unit 10 illustrated in FIG. 2, and therefore a description thereof will be omitted. In addition, since the drive unit 65 according to the ninth embodiment is configured to be symmetric with respect to the same shaft line Cnt as an output shaft 41 of an engine 11, in FIG. 27, a lower half part of the shaft line Cnt is omitted.

FIG. 28 is a table indicating operating modes selectable in the drive unit 65 illustrated in FIG. 27. Similar to the first to sixth modes illustrated in FIG. 3 for example, the first to sixth modes established in the drive unit 65 illustrated in FIG. 27 may be established by manipulating each of the clutches CL1 and CL2.

FIG. 29 indicates the operating condition of the complex planetary gear unit of the drive unit 65 according to the ninth embodiment in the first mode.

As illustrated in FIG. 28, the first mode is established by engaging the first clutch CL1 and the brake BK while disengaging the second clutch CL2. In the first mode, the engine 11 stops, and the first motor 12 and the second motor 13 are operated as motors. The operating condition of the complex planetary gear unit of the drive unit 65 according to the ninth embodiment in the first mode is substantially the same as the operating condition shown in FIG. 4.

Figure 30:
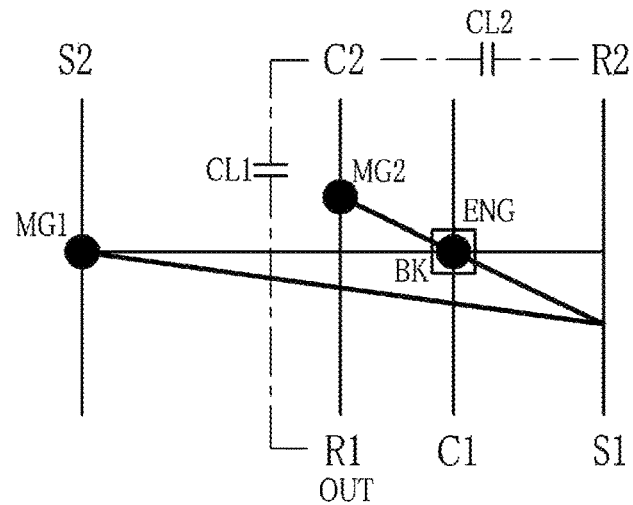
FIG. 30 is a nomographic diagram indicating a condition in a second mode shown in FIG. 28.

FIG. 30 indicates the operating condition of the complex planetary gear unit of the drive unit 65 according to the ninth embodiment in the second mode. As illustrated in FIG. 28, the second mode is established by disengaging the first clutch CL1, the second clutch CL2, and the brake BK. Therefore, it is possible to reduce the torque acting on the engine 11 or the first motor 12. The operating condition of the complex planetary gear unit of the drive unit 65 according to the ninth embodiment in the second mode is substantially the same as the operating condition shown FIG. 5. In other words, the drive torque is not generated by the engine 11 and the first motor 12 but is generated only by the second motor 13.

Figure 31:
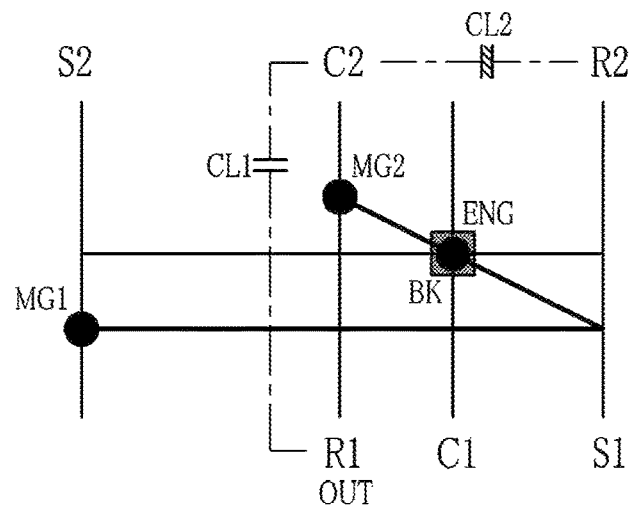
FIG. 31 is a nomographic diagram indicating a condition in a third mode illustrated in FIG. 28.

FIG. 31 indicates the operating condition of the complex planetary gear unit of the drive unit 65 according to the ninth embodiment in the third mode. As indicated in FIG. 28, the third mode is established by engaging the second clutch CL2 and the brake BK while disengaging the first clutch CL1. In the third mode, the engine 11 stops, and the first motor 12 and the second motor 13 are operated as motors. The operating condition of the complex planetary gear unit of the drive unit 65 according to the ninth embodiment in the third mode is substantially the same as the operating condition shown in FIG. 6.

Figure 32:
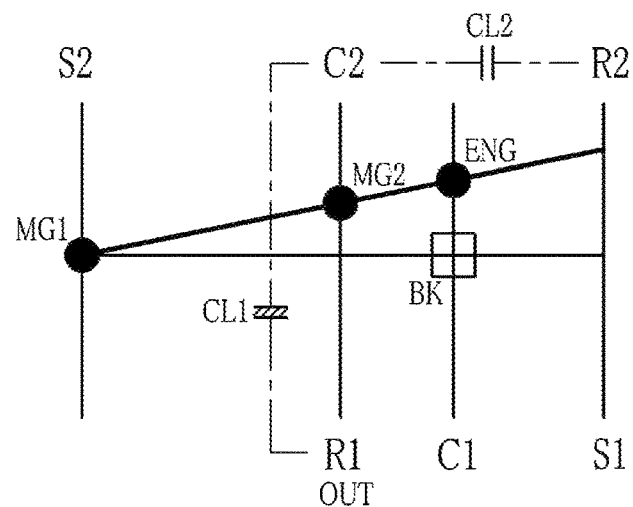
FIG. 32 is a nomographic diagram indicating a condition in a fourth mode shown in FIG. 28.

FIG. 32 indicates the operating condition of the complex planetary gear unit of the drive unit 65 according to the ninth embodiment in the fourth mode. As indicated in FIG. 28, the fourth mode is established by engaging the first clutch CL1 while disengaging the second clutch CL2 and the brake BK. In the fourth mode, the engine 11 is operated, the first motor 12 establishes the reaction torque, and the second motor 13 is operated as the motor. Therefore, the drive torque generated by the engine 11 and the drive torque generated by the second motor 13 are synthesized, and the vehicle is operated by the synthesized torque. The operating condition of the complex planetary gear unit of the drive unit 65 according to the ninth embodiment in the fourth mode is substantially the same as the operating condition shown in FIG. 7.

Figure 33:
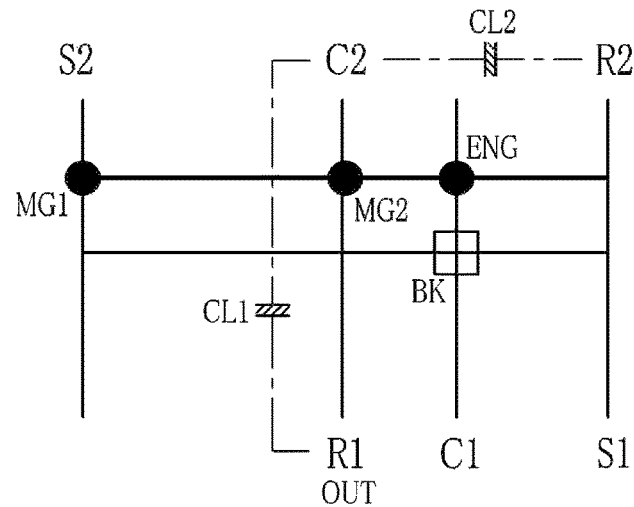
FIG. 33 is a nomographic diagram indicating a condition in a fifth mode shown in FIG. 28.

FIG. 33 indicates the operating condition of the complex planetary gear unit of the drive unit 65 according to the ninth embodiment in the fifth mode. As indicated in FIG. 28, the fifth mode is established by engaging the first clutch CL1 and the second clutch CL2 while disengaging the brake BK. In the fifth mode, the drive torque to propel the vehicle is generated only by the engine 11. The operating condition of the complex planetary gear unit of the drive unit 65 according to the ninth embodiment in the fifth mode is substantially the same as the operating condition shown in FIG. 8. In the fifth mode, the drive torque may be generated by any one of the first motor 12 and the second motor 13, and any one of the first motor 12 and the second motor may serve as a generator.

Figure 34:
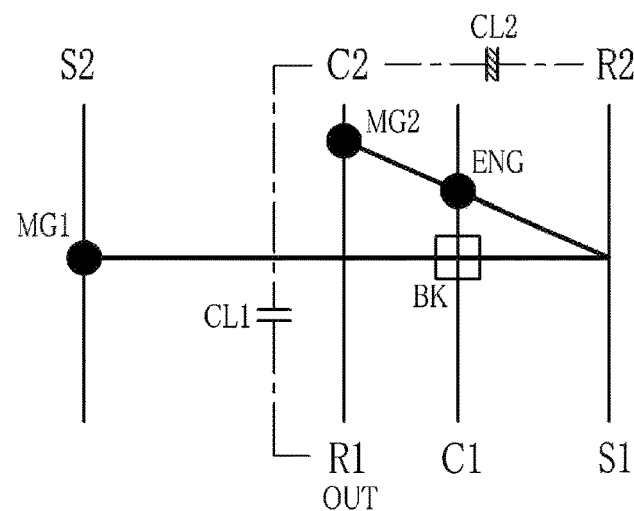
FIG. 34 is a nomographic diagram indicating a condition in a sixth mode shown in FIG. 28.

FIG. 34 indicates the operating condition of the complex planetary gear unit of the drive unit 65 according to the ninth embodiment in the sixth mode. As indicated in FIG. 28, the sixth mode is established by engaging the second clutch CL2 while disengaging the first clutch CL1 and the brake BK. In the sixth mode, the engine 11 is operated, the first motor 12 establishes the reaction torque, and the second motor 13 is operated as the motor. Therefore, the drive torque generated by the engine 11 and the drive torque generated by the second motor 13 are synthesized, and the vehicle is operated by the synthesized torque. The operating condition of the complex planetary gear unit of the drive unit 65 according to the ninth embodiment in the sixth mode is substantially the same as the operating condition shown in FIG. 9.

Tenth Embodiment

In a drive unit 65 according to a tenth embodiment, a first ring gear R1 and a second ring gear R2 are connected to each other, a first sun gear S1 and a second carrier C2 are selectively connected to each other, the second carrier C2 and the second ring gear R2 are selectively connected to each other, an engine 11 is connected to a first carrier C1, a first motor 12 is connected to a second sun gear S2, and a second motor 13 is connected to the first sun gear S1. In the drive unit 65 according to the tenth embodiment, the first carrier C1 serves as the first rotary element 25 shown in FIG. 26, the first sun gear S1 serves as the second rotary element 26 shown in FIG. 26, the first ring gear R1 serves as the third rotary element 27 shown in FIG. 26, the second sun gear S2 serves as the fourth rotary element 28 shown in FIG. 26, the second ring gear R2 serves as the fifth rotary element 29 shown in FIG. 26, and the second carrier C2 serves as the sixth rotary element 30 shown in FIG. 26.

In the tenth embodiment, the first clutch CL1 selectively connects the first sun gear S1 and the second carrier C2, the second clutch CL2 selectively connects the second carrier C2 and the second ring gear R2, and the brake BK selectively connects the first carrier C1 and a fixed member 32.

Figure 35:
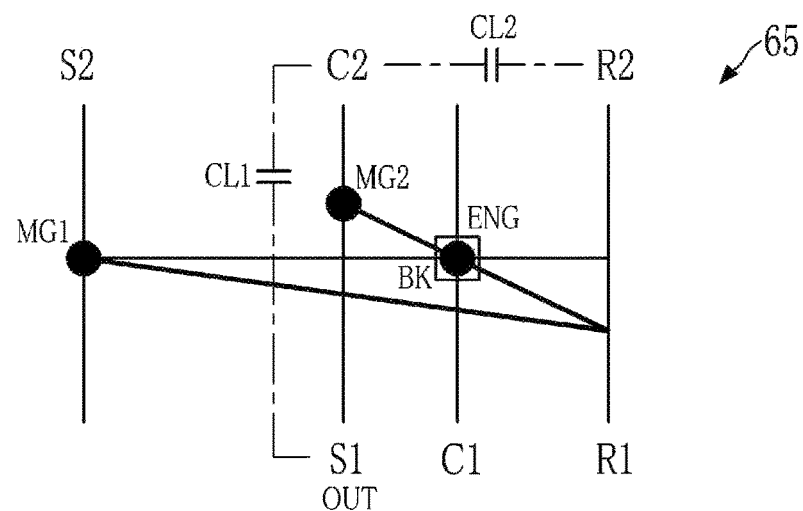
FIG. 35 is a nomographic diagram indicating a condition in a second mode in a drive unit according to a tenth embodiment.

In the drive unit 65 according to the tenth embodiment, a second mode can be established by disengaging the first clutch CL1, the second clutch CL2, and the brake BK. FIG. 35 indicates the operating condition of the complex planetary gear unit of the drive unit 65 according to the tenth embodiment in the second mode. As indicated in FIGS. 5 and 35, in the second mode, the operating condition of the complex planetary gear unit of the drive unit 65 according to the tenth embodiment is substantially the same as the operating condition shown in FIG. 5. The operating conditions of the complex planetary gear unit of the drive unit 65 according to the tenth embodiment in the first mode and the third to sixth modes are substantially the same as the operating conditions shown in FIGS. 4 and 6 to 9.

Eleventh Embodiment

In a drive unit 65 according to an eleventh embodiment, a first ring gear R1 and a second sun gear S2 are connected to each other, a first sun gear S1 and a second carrier C2 are selectively connected to each other, the second carrier C2 and a second ring gear R2 are selectively connected to each other, an engine 11 is connected to a first carrier C1, a first motor 12 is connected to the second ring gear R2, and a second motor 13 is connected to the first sun gear S1. In the drive unit 65 according to the eleventh embodiment, the first carrier C1 serves as the first rotary element 25 shown in FIG. 26, the first sun gear S1 serves as the second rotary element 26 shown in FIG. 26, the first ring gear R1 serves as the third rotary element 27 shown in FIG. 26, the second ring gear R2 serves as the fourth rotary element 28 shown in FIG. 26, the second sun gear S2 serves as the fifth rotary element 29 shown in FIG. 26, and the second carrier C2 serves as the sixth rotary element 30 shown in FIG. 26.

In the eleventh embodiment, the first clutch CL1 selectively connects the first sun gear S1 and the second carrier C2, the second clutch CL2 selectively connects the second carrier C2 and the second ring gear R2, and the brake BK selectively connects the first carrier C1 and a fixed member 32.

Figure 36:
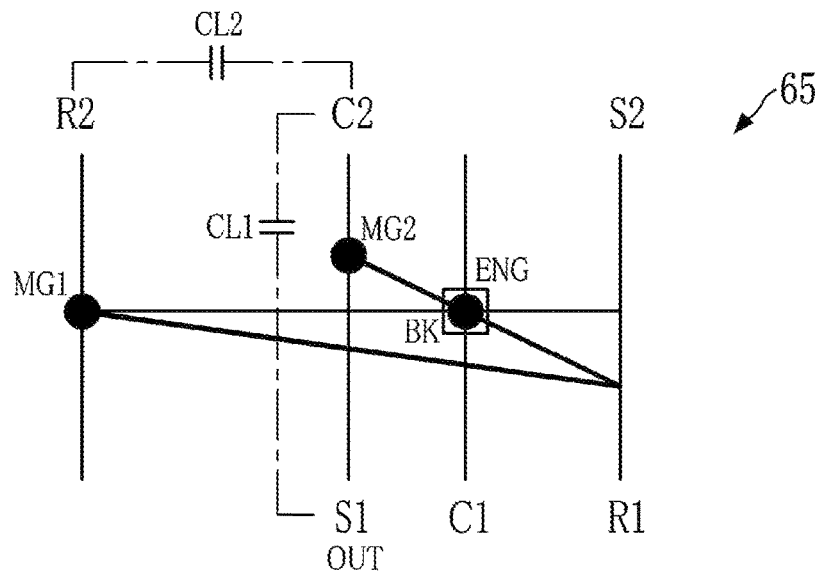
FIG. 36 is a nomographic diagram indicating a condition in a second mode in a drive unit according to an eleventh embodiment.

In the drive unit 65 according to the eleventh embodiment, a second mode can be established by disengaging the first clutch CL1, the second clutch CL2, and the brake BK. FIG. 36 indicates the operating condition of the complex planetary gear unit of the drive unit 65 according to the eleventh embodiment in the second mode. As indicated in FIGS. 5 and 36, in the second mode, the operating condition of the complex planetary gear unit of the drive unit 65 according to the eleventh embodiment is substantially the same as the operating condition shown in FIG. 5. The operating conditions of the complex planetary gear unit of the drive unit 65 according to the eleventh embodiment in the first mode and the third to sixth modes are substantially the same as the operating conditions shown in FIGS. 4 and 6 to 9.

Twelfth Embodiment

In a drive unit 65 according to a twelfth embodiment, a first sun gear S1 and a second sun gear S2 are connected to each other, a first ring gear R1 and a second carrier C2 are selectively connected to each other, the second sun gear S2 and a second ring gear R2 are selectively connected to each other, an engine 11 is connected to a first carrier C1, a first motor 12 is connected to the second ring gear R2, and a second motor 13 is connected to the first ring gear R1. In the drive unit 65 according to the twelfth embodiment, the first carrier C1 serves as the first rotary element 25 shown in FIG. 26, the first ring gear R1 serves as the second rotary element 26 shown in FIG. 26, the first sun gear S1 serves as the third rotary element 27 shown in FIG. 26, the second ring gear R2 serves as the fourth rotary element 28 shown in FIG. 26, the second sun gear S2 serves as the fifth rotary element 29 shown in FIG. 26, and the second carrier C2 serves as the sixth rotary element 30 shown in FIG. 26.

In the twelfth embodiment, the first clutch CL1 selectively connects the first ring gear R1 and the second carrier C2, the second clutch CL2 selectively connects the second sun gear S2 and the second ring gear R2, and the brake BK selectively connects the first carrier C1 and a fixed member 32.

Figure 37:
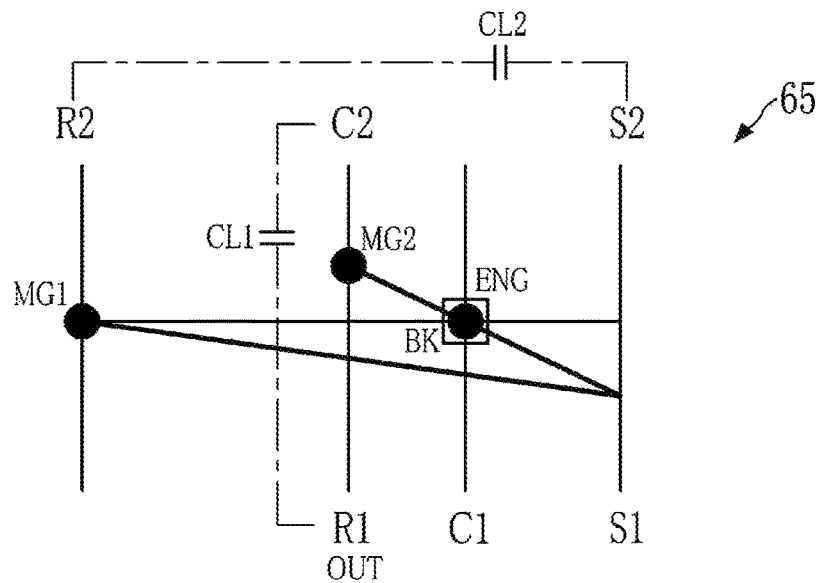
FIG. 37 is a nomographic diagram indicating a condition in a second mode in a drive unit according to a twelfth embodiment.

In the drive unit 65 according to the twelfth embodiment, a second mode can be established by disengaging the first clutch CL1, the second clutch CL2, and the brake BK. FIG. 37 indicates the operating condition of the complex planetary gear unit of the drive unit 65 according to the twelfth embodiment in the second mode. As illustrated in FIGS. 5 and 37, the operating condition of the complex planetary gear unit of the drive unit 65 according to the twelfth embodiment in the second mode is substantially the same as the operating condition shown in FIG. 5. The operating conditions of the complex planetary gear unit of the drive unit 65 according to the twelfth embodiment in the first mode and the third to sixth modes are substantially the same as the operating conditions shown in FIGS. 4 and 6 to 9.

Thirteenth Embodiment

Figure 38:
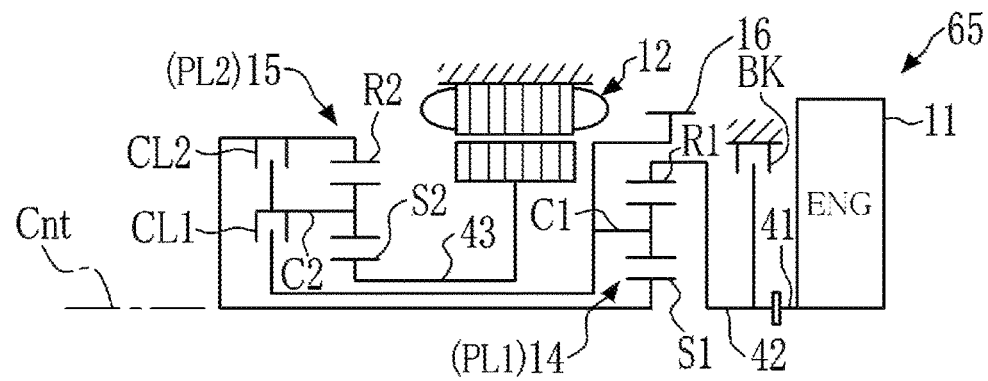
FIG. 38 is a skeleton diagram illustrating a drive unit according to a thirteenth embodiment.

FIG. 38 is a skeleton diagram illustrating a drive unit 65 according to a thirteenth embodiment. In the drive unit 65 according to the thirteenth embodiment, a first sun gear S1 and a second ring gear R2 are connected to each other, a first carrier C1 and a second carrier C2 are selectively connected to each other, the second carrier C2 and the second ring gear R2 are selectively connected to each other, an engine 11 is connected to a first ring gear R1, a first motor 12 is connected to a second sun gear S2, and a second motor 13 is connected to the first carrier C1. In the drive unit 65 according to the thirteenth embodiment, the first ring gear R1 serves as the first rotary element 25 shown in FIG. 26, the first carrier C1 serves as the second rotary element 26 shown in FIG. 26, the first sun gear S1 serves as the third rotary element 27 shown in FIG. 26, the second sun gear S2 serves as the fourth rotary element 28 shown in FIG. 26, the second ring gear R2 serves as the fifth rotary element 29 shown in FIG. 26, and the second carrier C2 serves as the sixth rotary element 30 shown in FIG. 26.

In the thirteenth embodiment, the first clutch CL1 selectively connects the first carrier C1 and the second carrier C2, the second clutch CL2 selectively connects the second carrier C2 and the second ring gear R2, and the brake BK selectively connects the first ring gear R1 and a fixed member 32.

It should be noted that in FIG. 38, a power transmitting route including the second motor 13 from an output member 16 to a drive wheel 53 has a similar configuration to the drive unit 10 illustrated in FIG. 2, and therefore a description thereof will be omitted. In addition, since the drive unit 65 according to the thirteenth embodiment is configured to be symmetric with respect to the same shaft line Cnt as an output shaft 41 of the engine 11, in FIG. 38, a lower half part of the shaft line Cnt is omitted.

FIG. 39 is a table indicating operating modes selectable in the drive unit 65 illustrated in FIG. 38. Similar to the first to sixth modes illustrated in FIG. 16 for example, the first to sixth modes established in the drive unit 65 illustrated in FIG. 38 may be established by manipulating each of the clutches CL1 and CL2.

FIG. 40 indicates the operating condition of the complex planetary gear unit of the drive unit 65 according to the thirteenth embodiment in the first mode.

As indicated in FIG. 39, the first mode is established by engaging the second clutch CL2 and the brake BK while disengaging the first clutch CL1. In the first mode, the engine 11 stops, and the first motor 12 and the second motor 13 are operated as motors. The operating condition of the complex planetary gear unit of the drive unit 65 according to the thirteenth embodiment in the first mode is substantially the same as the operating condition shown in FIG. 17.

FIG. 41 indicates the operating condition of the complex planetary gear unit of the drive unit 65 according to the thirteenth embodiment in the second mode. As indicated in FIG. 39, the second mode is established by disengaging the first clutch CL1, the second clutch CL2, and the brake BK. The operating condition of the complex planetary gear unit of the drive unit 65 according to the thirteenth embodiment in the second mode is substantially the same as the operating condition shown in FIG. 18.

Figure 42:
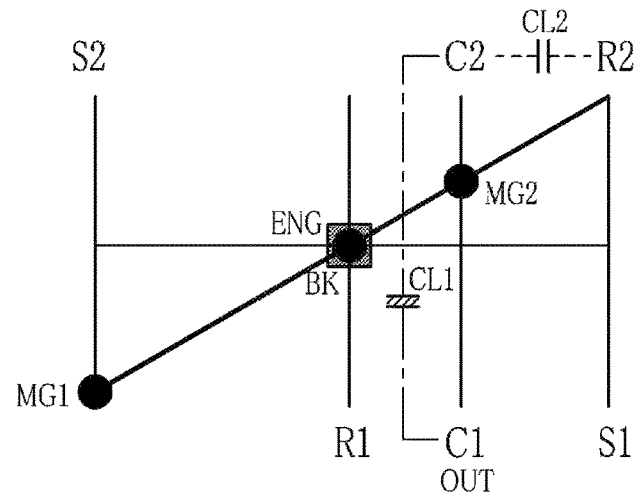
FIG. 42 is a nomographic diagram indicating a condition in a third mode shown in FIG. 39.

FIG. 42 indicates the operating condition of the complex planetary gear unit of the drive unit 65 according to the thirteenth embodiment in the third mode. As indicated in FIG. 39, the third mode is established by engaging the first clutch CL1 and the brake BK while disengaging the second clutch CL2. The operating condition of the complex planetary gear unit of the drive unit 65 according to the thirteenth embodiment in the third mode is substantially the same as the operating condition shown in FIG. 19.

Figure 43:
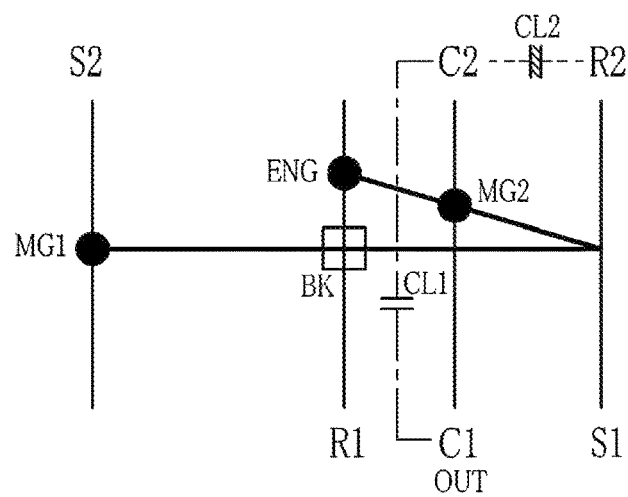
FIG. 43 is a nomographic diagram indicating a condition in a fourth mode shown in FIG. 39.

FIG. 43 indicates the operating condition of the complex planetary gear unit of the drive unit 65 according to the thirteenth embodiment in the fourth mode. As indicated in FIG. 39, the fourth mode is established by engaging the second clutch CL2 while disengaging the first clutch CL1 and the brake BK. The operating condition of the complex planetary gear unit of the drive unit 65 according to the thirteenth embodiment in the fourth mode is substantially the same as the operating condition shown in FIG. 20.

Figure 44:
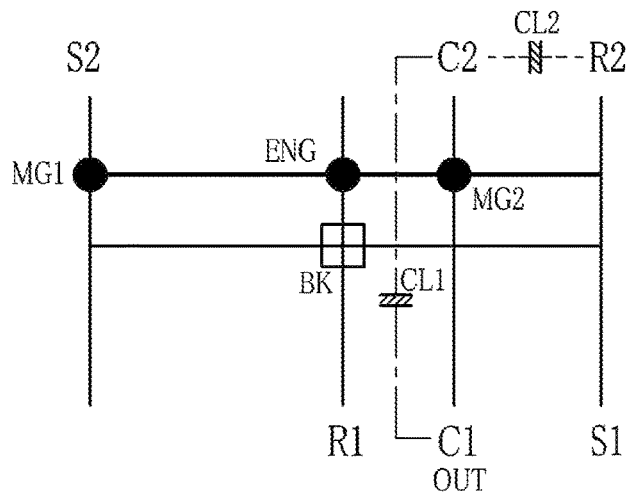
FIG. 44 is a nomographic diagram indicating a condition in a fifth mode shown in FIG. 39.

FIG. 44 indicates the operating condition of the complex planetary gear unit of the drive unit 65 according to the thirteenth embodiment in the fifth mode. As indicated in FIG. 39, the fifth mode is established by engaging the first clutch CL1 and the second clutch CL2 while disengaging the brake BK. The operating condition of the complex planetary gear unit of the drive unit 65 according to the thirteenth embodiment in the fifth mode is substantially the same as the operating condition shown in FIG. 21.

Figure 45:
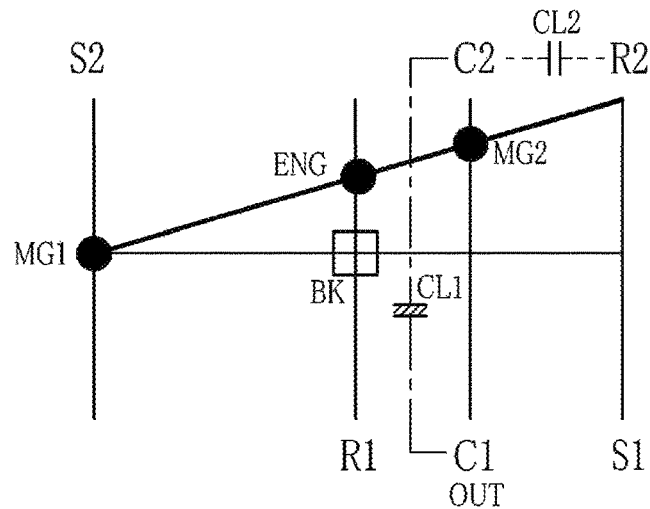
FIG. 45 is a nomographic diagram indicating a condition in a sixth mode shown in FIG. 39.

FIG. 45 indicates the operating condition of the complex planetary gear unit of the drive unit 65 according to the thirteenth embodiment in the sixth mode. As indicated in FIG. 39, the sixth mode is established by engaging the first clutch CL1 while disengaging the second clutch CL2 and the brake BK. The operating condition of the complex planetary gear unit of the drive unit 65 according to the thirteenth embodiment in the sixth mode is substantially the same as the operating condition shown in FIG. 22.

Fourteenth Embodiment

In a drive unit 65 according to a fourteenth embodiment, a first sun gear S1 and a second sun gear S2 are connected to each other, a first carrier C1 and a second carrier C2 are selectively connected to each other, the second sun gear S2 and the second carrier C2 are selectively connected to each other, an engine 11 is connected to a first ring gear R1, a first motor 12 is connected to a second ring gear R2, and a second motor 13 is connected to the first carrier C1.

In the drive unit 65 according to the fourteenth embodiment, the first ring gear R1 serves as the first rotary element 25 shown in FIG. 26, the first carrier C1 serves as the second rotary element 26 shown in FIG. 26, the first sun gear S1 serves as the third rotary element 27 shown in FIG. 26, the second ring gear R2 serves as the fourth rotary element 28 shown in FIG. 26, the second sun gear S2 serves as the fifth rotary element 29 shown in FIG. 26, and the second carrier C2 serves as the sixth rotary element 30 shown in FIG. 26.

In the fourteenth embodiment, the first clutch CL1 selectively connects the first carrier C1 and the second carrier C2, the second clutch CL2 selectively connects the second carrier C2 and the second sun gear S2, and the brake BK selectively connects the first ring gear R1 and a fixed member 32.

Figure 46:
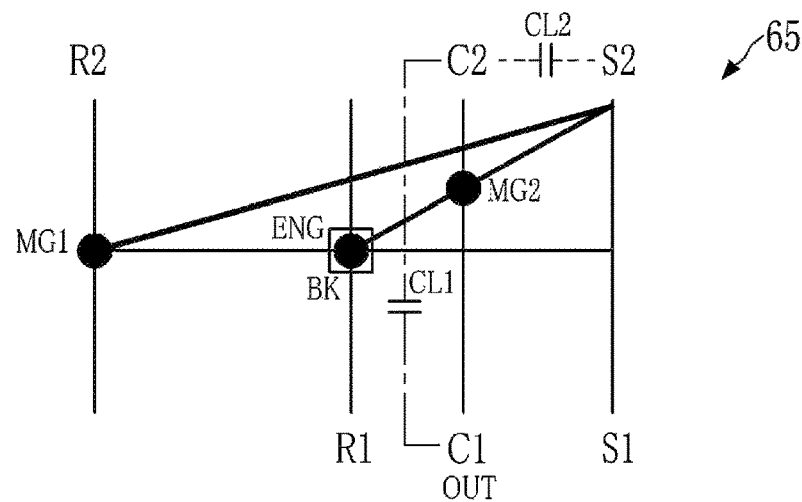
FIG. 46 is a nomographic diagram indicating a condition in a second mode in a drive unit according to a fourteenth embodiment.

In the drive unit 65 according to the fourteenth embodiment, a second mode can be established by disengaging the first clutch CL1, the second clutch CL2, and the brake BK. FIG. 46 indicates the operating condition of the complex planetary gear unit of the drive unit 65 according to the fourteenth embodiment in the second mode. As indicated in FIGS. 5 and 46, the operating condition of the complex planetary gear unit of the drive unit 65 according to the fourteenth embodiment in the second mode is substantially the same as the operating condition shown in FIG. 5. The operating conditions of the complex planetary gear unit of the drive unit 65 according to the fourteenth embodiment in the first mode and the third to sixth modes are substantially the same as the operating conditions shown in FIGS. 4 and 6 to 9.

Fifteenth Embodiment

In a drive unit 65 according to a fifteenth embodiment, a first ring gear R1 and a second sun gear S2 are connected to each other, a first carrier C1 and a second carrier C2 are selectively connected to each other, the second sun gear S2 and the second carrier C2 are selectively connected to each other, an engine 11 is connected to a first sun gear S1, a first motor 12 is connected to a second ring gear R2, and a second motor 13 is connected to the first carrier C1.

In the drive unit 65 according to the fifteenth embodiment, the first sun gear S1 serves as the first rotary element 25 shown in FIG. 26, the first carrier C1 serves as the second rotary element 26 shown in FIG. 26, the first ring gear R1 serves as the third rotary element 27 shown in FIG. 26, the second ring gear R2 serves as the fourth rotary element 28 shown in FIG. 26, the second sun gear S2 serves as the fifth rotary element 29 shown in FIG. 26, and the second carrier C2 serves as the sixth rotary element 30 shown in FIG. 26.

In the fifteenth embodiment, the first clutch CL1 selectively connects the first carrier C1 and the second carrier C2, the second clutch CL2 selectively connects the second carrier C2 and the second sun gear S2, and the brake BK selectively connects the first sun gear S1 and a fixed member 32.

Figure 47:
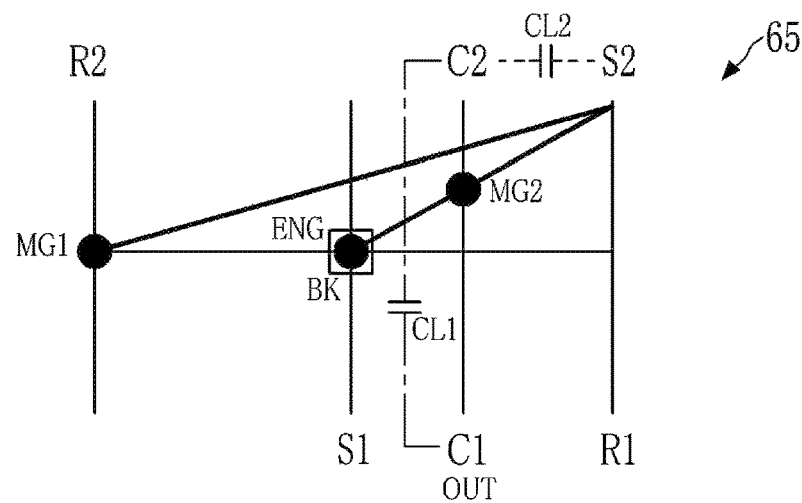
FIG. 47 is a nomographic diagram indicating a condition in a second mode in a drive unit according to a fifteenth embodiment.

In the drive unit 65 according to the fifteenth embodiment, a second mode can be established by disengaging the first clutch CL1, the second clutch CL2, and the brake BK. FIG. 47 indicates the operating condition of the complex planetary gear unit of the drive unit 65 according to the fifteenth embodiment in the second mode. As indicated in FIGS. 5 and 47, the operating condition of the complex planetary gear unit of the drive unit 65 according to the fifteenth embodiment in the second mode is substantially the same as the operating condition shown in FIG. 5. The operating conditions of the complex planetary gear unit of the drive unit 65 according to the fifteenth embodiment in the first mode and the third to sixth modes are substantially the same as the operating conditions shown in FIGS. 4 and 6 to 9.

Sixteenth Embodiment

In a drive unit 65 according to a sixteenth embodiment, a first ring gear R1 and a second ring gear R2 are connected to each other, a first carrier C1 and a second carrier C2 are selectively connected to each other, the second ring gear R2 and the second carrier C2 are selectively connected to each other, an engine 11 is connected to a first sun gear S1, a first motor 12 is connected to a second sun gear S2, and a second motor 13 is connected to the first carrier C1.

In the drive unit 65 according to the sixteenth embodiment, the first sun gear S1 serves as the first rotary element 25 shown in FIG. 26, the first carrier C1 serves as the second rotary element 26 shown in FIG. 26, the first ring gear R1 serves as the third rotary element 27 shown in FIG. 26, the second sun gear S2 serves as the fourth rotary element 28 shown in FIG. 26, the second ring gear R2 serves as the fifth rotary element 29 shown in FIG. 26, and the second carrier C2 serves as the sixth rotary element 30 shown in FIG. 26.

In the sixteenth embodiment, the first clutch CL1 selectively connects the first carrier C1 and the second carrier C2, the second clutch CL2 selectively connects the second carrier C2 and the second ring gear R2, and the brake BK selectively connects the first sun gear S1 and a fixed member 32.

In the drive unit 65 according to the sixteenth embodiment, a second mode can be established by disengaging the first clutch CL1, the second clutch CL2, and the brake BK. FIG. 48 indicates the operating condition of the complex planetary gear unit of the drive unit 65 according to the sixteenth embodiment in the second mode. As indicated in FIGS. 5 and 48, the operating condition of the complex planetary gear unit of the drive unit 65 according to the sixteenth embodiment in the second mode is substantially the same as the operating condition shown in FIG. 5. The operating conditions of the complex planetary gear unit of the drive unit 65 according to the sixteenth embodiment in the first mode and the third to sixth modes are substantially the same as the operating conditions shown in FIGS. 4 and 6 to 9.

Seventeenth Embodiment

FIG. 49 is a skeleton diagram illustrating a drive unit 70 according to a seventeenth embodiment. In the drive unit 70 according to the seventeenth embodiment, a first sun gear S1 and a second sun gear S2 are connected to each other, a first clutch CL1 is engaged to selectively connect a first carrier C1 and a second ring gear R2, a second clutch CL2 is engaged to selectively connect the second sun gear S2 and the second ring gear R2, a second brake BK2 is engaged to selectively connect a second carrier C2 and a fixed member 32, an engine 11 is connected to the first carrier C1, a first motor 12 is connected to the second sun gear S2, and a second motor 13 is connected to the first ring gear R1. In the seventeenth embodiment, the second brake BK2 serves as a fourth engagement device. As the second brake BK2, a one-way clutch may also be adopted to prevent the second carrier C2 from rotating in a count direction to the engine 11. It should be noted that in the seventeenth embodiment, a brake BK that halts an output shaft 41 of the engine 11 is not provided.

It should be noted that in FIG. 49, a power transmitting route including the second motor 13 from an output member 16 to a drive wheel 53 has a similar configuration to the drive unit 10 illustrated in FIG. 2, and therefore a description thereof will be omitted. In addition, since the drive unit 70 according to the seventeenth embodiment is configured to be symmetric with respect to the same shaft line Cnt as the output shaft 41 of the engine 11, in FIG. 49, a lower half part of the shaft line Cnt is omitted.

FIG. 50 is a table indicating an operating mode selectable in the drive unit 70 illustrated in FIG. 49. The operating mode of the drive unit 70 can be shifted among the first to sixth modes by manipulating the first clutch CL1, the second clutch CL2, and the second brake BK2 by the HV_ECU 22. In FIG. 50, "X" indicates disengagement of the engagement devices, "O" indicates engagement or application of the engagement devices, and "-" indicates that the second brake BK2 may be engaged or disengaged.

The first mode is a dual-motor mode that is selected when the vehicle speed is high and the required drive force is large during propulsion in the electric vehicle mode, and the first mode is established by engaging the first clutch CL1 and the second brake BK2 while disengaging the second clutch CL2.

The second mode is a single-motor mode that is selected when the vehicle speed is low and the required drive force is small during propulsion in the EV mode, and in the second mode, the drive torque is generated by the second motor 13 to propel the vehicle. In principle, the second mode is established by disengaging the first clutch CL1, the second clutch CL2, and the second brake BK2. Therefore, the operating condition of the complex planetary gear unit in the second mode is substantially the same as the operating condition in the second mode described with reference to FIG. 5. Therefore, it is possible to reduce the electric power consumption when the vehicle is operated in the second mode in a similar manner as the second mode described with reference to FIG. 5.

The third mode is a speed reducing stage in the hybrid mode, and is established by disengaging the first clutch CL1 while engaging the second clutch CL2 and the second brake BK2. In the third mode, rotations of the rotary element in the second planetary gear unit 15 are stopped by engaging the second clutch CL2 and the second brake BK2. Consequently, a rotation of the first sun gear S1 is also stopped. Accordingly, the first carrier C1 serves as the input element, the first sun gear S1 serves as the reaction element, and the first ring gear R1 serves as the output element. In this case, the speed ratio between the first ring gear R1 and the first carrier C1 becomes a constant speed reducing ratio. As a result, the output torque of the engine 11 is amplified according to the speed reducing ratio and delivered from the first ring gear R1. In the third mode, the torque delivered from the first ring gear R1 is synthesized with the drive torque of the second motor 13 to propel the vehicle.

The fourth mode is established by engaging the first clutch CL1 while disengaging the second clutch CL2 and the second brake BK2. The operating condition of the complex planetary gear unit in the fourth mode is substantially the same as the operating condition in the fourth mode described with reference to FIG. 7.

The fifth mode is established by engaging the first clutch CL1 and the second clutch CL2 while disengaging the second brake BK2. The operating condition of the complex planetary gear unit in the fifth mode is substantially the same as the operating condition in the fifth mode described with reference to FIG. 8.

The sixth mode is established by engaging only the second clutch CL2. The operating condition of the complex planetary gear unit in the sixth mode is substantially the same as the operating condition in the sixth mode described with reference to FIG. 9.

Figure 51:
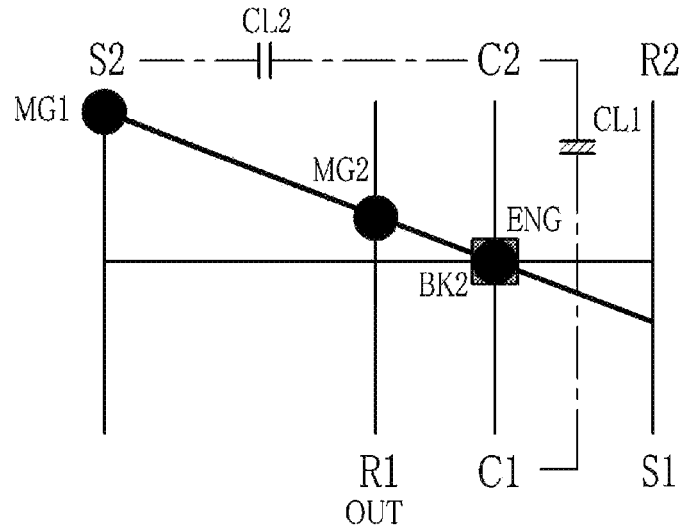
FIG. 51 is a nomographic diagram indicating a condition in a first mode shown in FIG. 50.

FIG. 51 indicates the operating condition of the complex planetary gear unit of the drive unit 70 according to the seventeenth embodiment in the first mode. As described above, in the first mode, the first sun gear S1 and the second ring gear R2 are connected to each other, and the first carrier C1 and the second carrier C2 are connected to each other by engaging the first clutch CL1. Therefore, the first sun gear S1 and the second ring gear R2 are rotated integrally, and the first carrier C1 and the second carrier C2 are rotated integrally. In addition, rotations of the first carrier C1 and the second carrier C2 are stopped by engaging the second brake BK2. Consequently, a rotation of the output shaft 41 of the engine 11 is stopped. That is, when the drive torque is generated by the first motor 12, the first carrier C1 and the second carrier C2 establish the reaction torque. In the first mode, therefore, the vehicle can be propelled by the drive torques of the first motor 12 and the second motor 13. For this reason, when the vehicle is propelled at a low speed, the maximum drive force can be increased in comparison with that in the second mode in which the vehicle is operated only by the drive torque of the second motor 13. The operating condition of the complex planetary gear unit in the first mode is substantially the same as the operating condition in the first mode described with reference to FIG. 4.

Figure 52:
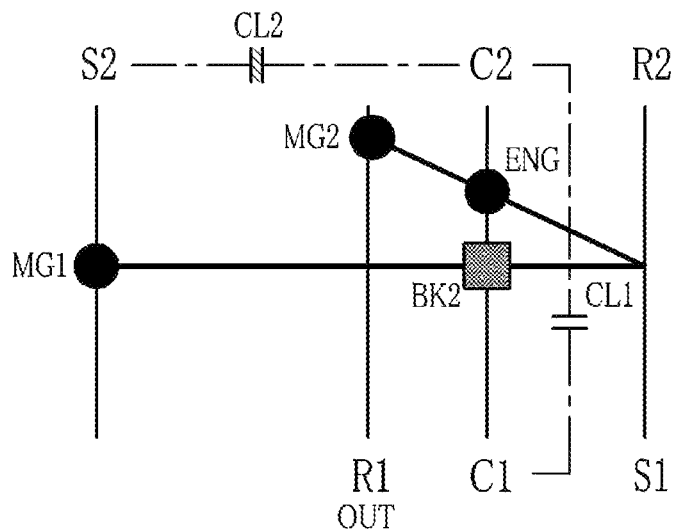
FIG. 52 is a nomographic diagram indicating a condition in a third mode shown in FIG. 50.

FIG. 52 indicates the operating condition of the complex planetary gear unit of the drive unit 70 according to the seventeenth embodiment in the third mode. As described, the third mode is established by engaging the second clutch CL2 and the second brake BK2. Since the second sun gear S2 and the second carrier C2 are connected to each other, rotations of the rotary elements in the second planetary gear unit 15 are stopped. Therefore, when the drive torque is generated by the engine 11, the first sun gear S1 and the second ring gear R2 serve as the reaction elements. As a result, the vehicle can be operated by using the engine 11 and the second motor 13 as prime movers while stopping the first motor 12. Therefore, it is possible to reduce an energy loss in a high speed range.

It should be noted that the second brake BK2 may also be used in the drive unit 10 illustrated in FIG. 12, the drive unit 10 illustrated in FIG. 13, the drive unit 10 illustrated in FIG. 14, and the drive unit 10 illustrated in FIG. 15. In addition, the brake BK illustrated in FIG. 2 may also be used in the drive unit 70 illustrated in FIG. 49.

Eighteenth Embodiment

Figure 53:
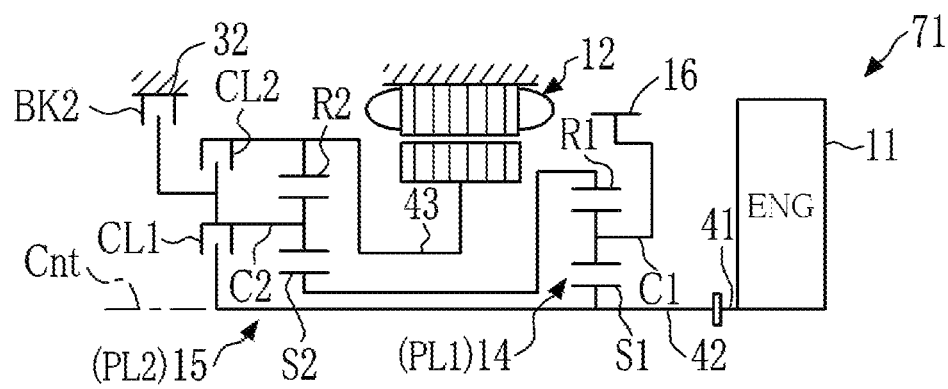
FIG. 53 is a skeleton diagram illustrating a drive unit according to an eighteenth embodiment.

FIG. 53 is a skeleton diagram showing a drive unit 71 according to an eighteenth embodiment. In the drive unit 71 according to the eighteenth embodiment, a first ring gear R1 and a second sun gear S2 are connected to each other, a first clutch CL1 is engaged to selectively connect a first sun gear S1 and a second carrier C2, a second clutch CL2 is engaged to selectively connect the second carrier C2 and a second ring gear R2, a second brake BK2 is engaged to selectively connect the second carrier C2 and a fixed member 32, an engine 11 is connected to the first sun gear S1, a first motor 12 is connected to the second ring gear R2, and a second motor 13 is connected to a first carrier C1. In the eighteenth embodiment, the second brake BK2 serves as a fourth engagement device. As the second brake BK2, a one-way clutch may also be used to prevent the second carrier C2 from rotating in a count direction to the engine 11. It should be noted that in the eighteenth embodiment, a brake BK that fixes an output shaft 41 of the engine 11 is not provided.

In the drive unit 71 according to the eighteenth embodiment, the first sun gear S1 serves as the first rotary element 25 shown in FIG. 26, the first carrier C1 serves as the second rotary element 26 shown in FIG. 26, the first ring gear R1 serves as the third rotary element 27 shown in FIG. 26, the second ring gear R2 serves as the fourth rotary element 28 shown in FIG. 26, the second sun gear S2 serves as the fifth rotary element 29 shown in FIG. 26, and the second carrier C2 serves as the sixth rotary element 30 shown in FIG. 26.

It should be noted that in FIG. 53, a power transmitting route including the second motor 13 from an output member 16 to a drive wheel 53 has a similar configuration to the drive unit 10 illustrated in FIG. 2, and therefore a description thereof will be omitted. In addition, since the drive unit 71 according to the eighteenth embodiment is configured to be symmetric with respect to the same shaft line Cnt as the output shaft 41 of the engine 11, in FIG. 53, a lower half part of the shaft line Cnt is omitted.

FIG. 54 is a table indicating operating modes selectable in the drive unit 71 illustrated in FIG. 53. The operating mode of the drive unit 71 can be shifted among the first to sixth modes by manipulating the first clutch CL1, the second clutch CL2, and the second brake BK2 by the HV_ECU 22. In FIG. 54, "X" indicates the disengagement of the engagement devices, "O" indicates the engagement or application of the engagement devices, and "-" indicates that the second brake BK2 may be engaged or disengaged.

As indicated in FIG. 54, in the drive unit 71 according to the eighteenth embodiment, the dual-motor mode in which the vehicle is propelled by the drive torques of the first motor 12 and the second motor 13 is established by engaging the first clutch CL1 and the second brake BK2 while disengaging the second clutch CL2.

The single-motor mode in which the vehicle is propelled only by the drive torque of the second motor 13 is established by disengaging the first clutch CL1, the second clutch CL2, and the second brake BK2.

The Fix-Lo mode in which the vehicle is propelled by delivering the torque from the engine 11 to the drive wheel 53 without establishing the reaction torque by the first motor 12 is established by disengaging the first clutch CL1 while engaging the second clutch CL2 and the second brake BK2.

The HV-Hi mode is established by engaging only the first clutch CL1. In the HV-Hi mode, the first motor 12 establishes the reaction torque to deliver the torque from the engine 11 to the drive wheel 53 to propel the vehicle, and the speed of the engine 11 is reduced lower than that of the output member 16 by reducing the speed of the first motor 12 to zero.

The Fix-Hi mode in which the rotary elements of the complex planetary gear unit are rotated at the same speed is established by engaging the first clutch CL1 and the second clutch CL2 while disengaging the second brake BK2. In the Fix-Hi mode, the speed ratio of the complex planetary gear unit becomes "1", and the drive torque of the engine 11 is delivered to the output member 16 without being changed.

The HV-Lo mode is established by engaging only the second clutch CL2. In the HV-Lo mode, the reaction torque is established by the first motor 12 to deliver the torque from the engine 11 to the drive wheel 53 to propel the vehicle, and the speed of the engine 11 is increased higher than that of the output member 16 by reducing the speed of the first motor 12 to zero.

FIG. 55 indicates the operating condition of the complex planetary gear unit in the dual-motor mode. In the dual-motor mode, since the first clutch CL1 and the second brake BK2 are engaged, the first sun gear S1 and the second carrier C2 are connected to each other, and rotations of the first sun gear S1 and the second carrier C2 are stopped. As a result, in the dual-motor mode, the first sun gear S1 and the second carrier C2 serve as the reaction elements. Therefore, the drive torque generated by the first motor 12 is multiplied in accordance with a speed ratio between the second ring gear R2 and the first carrier to be delivered to the second ring gear R2. The vehicle is operated by the synthesized torque of the torque generated by the second motor 13 and the torque delivered to the second ring gear R2. Therefore, it is possible to establish the large drive force in comparison with that in the single-motor mode in which the vehicle is operated by generating the drive torque only by the second motor 13.

FIG. 56 indicates the operating condition of the complex planetary gear unit in the single-motor mode. The single-motor mode is similar to the second mode described above, and generates the drive torque only by the second motor 13 to propel the vehicle. In addition, since the vehicle can be propelled by disengaging the first clutch CL1, the second clutch CL2, and the second brake BK2, the engine 11 and the first motor 12 are stopped. As a result, it is possible to reduce the power loss and the electric power consumption due to the passive rotation of the engine 11 or the first motor 12.

Figure 57:
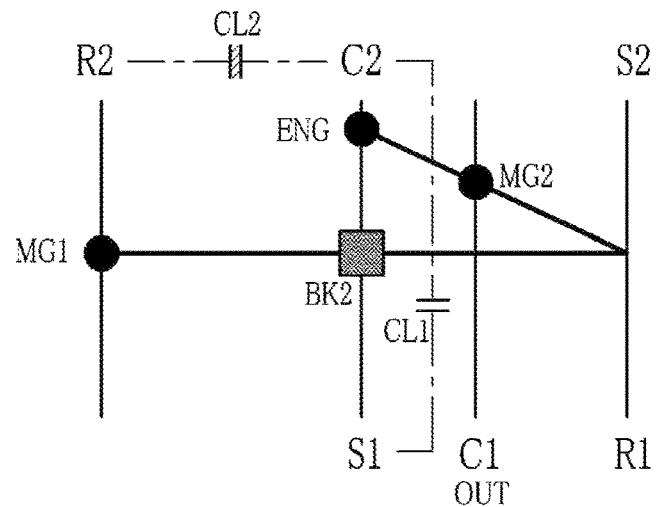
FIG. 57 is a nomographic diagram indicating a condition in a fix-Lo mode shown in FIG. 54.

FIG. 57 indicates the operating condition of the complex planetary gear unit in the Fix-Lo mode. In the Fix-Lo mode, the rotations of the rotary elements of the second planetary gear unit 15 and the first ring gear R1 are stopped by engaging the second clutch CL2 and the second brake BK2. That is, only the first planetary gear unit 14 performs the differential rotation. In this situation, since the first ring gear R1 stops, the speed of the engine 11 becomes higher than that of the first carrier C1 as the output element. As a result, the torque of the engine 11 is multiplied in accordance with the speed ratio between the engine 11 and the first carrier C1 and transmitted through the first carrier C1. In the Fix-Lo mode, the drive torque can be generated by the second motor 13 as needed. In other words, the vehicle can be operated by the engine 11 and the second motor 13 as the prime movers.

In the Fix-Lo mode, it is not necessary to establish the reaction torque by the first motor 12 even at the high vehicle speed. Therefore, it is possible to suppress the first motor 12 from serving as the motor in order for the first motor 12 to establish the reaction torque. As a result, occurrence of power circulation resulting from operating the first motor 12 as a motor and the second motor 13 as a generator can be suppressed and fuel consumption and power consumption may be reduced.

Figure 58:
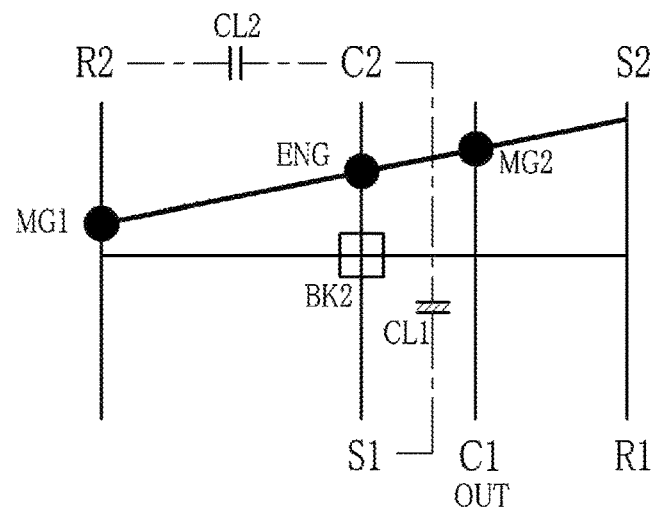
FIG. 58 is a nomographic diagram indicating a condition in an HV-Hi mode shown in FIG. 54.

FIG. 58 indicates the operating condition of the complex planetary gear unit in the HV-Hi mode. As described above, in the HV-Hi mode, only the first clutch CL1 is engaged to connect the first sun gear S1 to the second carrier C2 thereby rotating the first sun gear S1 and the second carrier C2 integrally. Specifically, the first sun gear S1 serves as the input element, the second ring gear R2 serves as the reaction element, and the first carrier C1 serves as the output element. In the HV-Hi mode, the drive torque is generated by the engine 11 and the reaction torque is established by the first motor 12 so that the drive torque generated by the engine 11 is delivered to the first carrier C1. The drive torque may also be generated by the second motor 13 as necessary, and the drive torque generated by the second motor 13 may be synthesized with the torque delivered to the first carrier C1 to propel the vehicle.

Figure 59:
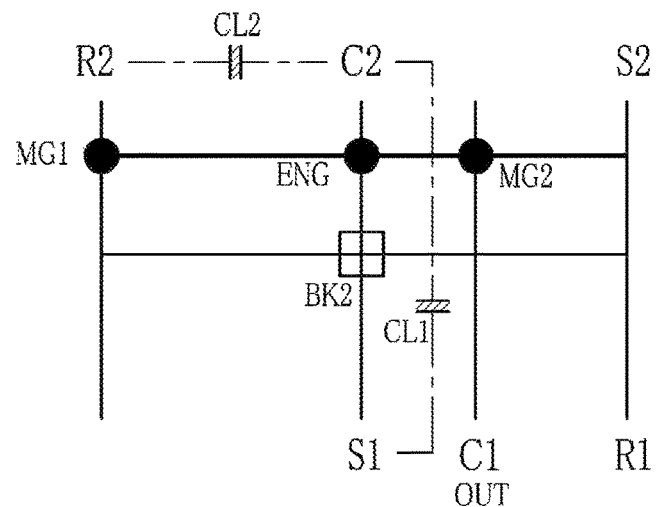
FIG. 59 is a nomographic diagram indicating a condition in a Fix-Hi mode shown in FIG. 54.

FIG. 59 indicates the operating condition of the complex planetary gear unit in the Fix-Hi mode. As indicated in FIGS. 8 and 59, the operating condition of the complex planetary gear unit in the Fix-Hi mode is similar to the operating condition shown in FIG. 8. In other words, the complex planetary gear unit establishes a fixed stage at which the gear ratio becomes "1". Therefore, it is possible to reduce the loss resulting from power conversion between electric power and kinetic power.

Figure 60:
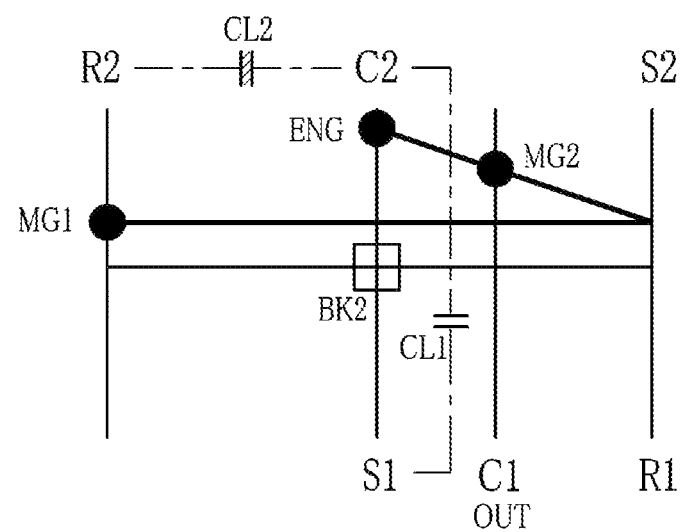
FIG. 60 is a nomographic diagram indicating a condition in an HV-Lo mode shown in FIG. 54.

FIG. 60 indicates the operating condition of the complex planetary gear unit in the HV-Lo mode. In the HV-Lo mode, the rotary elements of the second planetary gear unit 15 are rotated integrally by engaging the second clutch CL2. In other words, the speed of the rotary elements of the second planetary gear unit 15 is changed in accordance with the change in the speed of the first ring gear R1. That is, only the first planetary gear unit 14 performs differential rotation. Therefore, the drive torque of the engine 11 is delivered to the first carrier C1 to propel the vehicle by establishing the reaction torque by the first motor 12. The drive torque may also be generated by the second motor 13 as necessary, and the drive torque generated by the second motor 13 may be synthesized with the torque delivered to the first carrier C1 to propel the vehicle.

It should be noted that the second brake BK2 may be applied not only to the drive unit 71 illustrated in FIG. 53, but also to the drive unit 10 illustrated in FIG. 23, the drive unit 10 illustrated in FIG. 24, and the drive unit 10 illustrated in FIG. 25, for example. Further, the brake BK illustrated in FIG. 2 may also be used in the drive unit 71 illustrated in FIG. 53.

Although the above exemplary embodiments of the present application have been described, it will be understood by those skilled in the art that the present application should not be limited to the described exemplary embodiments, and various changes and modifications can be made within the spirit and scope of the present disclosure.

For example, the double-pinion type planetary gear unit may be used in place of at least any one of the respective planetary gear units. In this case, the carrier and the ring gear may be exchanged. In addition, the drive torque generated by the second motor 13 may be delivered to wheels different from the wheel to which the drive torque of the first motor 12 is delivered.

What is claimed is:

1. A drive unit for a hybrid vehicle in which a prime mover includes an engine, a first motor, and a second motor, and in which a drive torque generated by the prime mover is delivered to an output member connected to drive wheels, comprising:
  a first differential mechanism including a first rotary element to which the engine is connected, a second rotary element to which the second motor and the output member are connected, and a third rotary element;
  a second differential mechanism including a fourth rotary element to which the first motor is connected, a fifth rotary element directly connected to the third rotary element, and a sixth rotary element;
  a first engagement device adapted to selectively connect the first rotary element or the second rotary element to the sixth rotary element; and
  a second engagement device adapted to selectively connect any two of the fourth rotary element, the fifth rotary element, and the sixth rotary element,
  wherein an operating mode of the drive unit can be shifted among at least
    a single-motor mode in which a torque of the second motor is outputted while stopping the engine and the first motor, and that is established by disengaging both of the first engagement device and the second engagement device,
    an electric vehicle low (EV-Low) mode in which a torque of the first motor is outputted and that is established by engaging one of the first engagement device and the second engagement device, and
    an EV-High mode in which the torque of the first motor is outputted, in which a multiplying factor of the torque delivered from the first motor to the output member is smaller than a multiplying factor in the EV-Low mode, and that is established by engaging the other one of the first engagement device and the second engagement device,
  wherein the first differential mechanism includes a planetary gear unit, and
  wherein the planetary gear unit comprises:
  a first carrier that serves as the first rotary element;
  a first ring gear that serves as the second rotary element; and
  a first sun gear that serves as the third rotary element.

2. The drive unit for a hybrid vehicle according to claim 1, wherein the first engagement device is adapted to selectively connect the first rotary element to the sixth rotary element.

3. The drive unit for a hybrid vehicle according to claim 2, further comprising:
a fourth engagement device adapted to selectively connect the sixth rotary element to a predetermined fixed member.

4. The drive unit for a hybrid vehicle according to claim 2, wherein the second engagement device is adapted to selectively connect the fourth rotary element to the sixth rotary element.

5. The drive unit for a hybrid vehicle according to claim 2, wherein the second engagement device is adapted to selectively connect the fifth rotary element to the sixth rotary element.

6. The drive unit for a hybrid vehicle according to claim 2, wherein the second engagement device is adapted to selectively connect the fourth rotary element and the fifth rotary element.

7. The drive unit for a hybrid vehicle according to claim 1, wherein the first engagement device is adapted to selectively connect the second rotary element to the sixth rotary element.

8. The drive unit for a hybrid vehicle according to claim 1, further comprising:
a third engagement device adapted to selectively connect the first rotary element and a predetermined fixed member.

9. The drive unit for a hybrid vehicle according to claim 1,
wherein the second differential mechanism includes a planetary gear unit, and
wherein the planetary gear unit comprises:
a second sun gear that serves as the fourth rotary element;
a second ring gear that serves as the fifth rotary element; and
a second carrier that serves as the sixth rotary element.

10. The drive unit for a hybrid vehicle according to claim 1,
wherein the second differential mechanism includes a planetary gear unit, and
wherein the planetary gear unit comprises:
a second ring gear that serve as the fourth rotary element;
a second sun gear that serve as the fifth rotary element; and
a second carrier that serve as the sixth rotary element.

11. The drive unit for the hybrid vehicle according to claim 1,
wherein a direction of the torque delivered from the first motor to the output member in the EV-Low mode is the same direction as a direction of the torque delivered from the first motor to the output member in the EV-High mode.

* * * * *